US008863233B2

(12) United States Patent
Yamahara

(10) Patent No.: US 8,863,233 B2
(45) Date of Patent: Oct. 14, 2014

(54) RESPONSE DETERMINATION APPARATUS, RESPONSE DETERMINATION METHOD, RESPONSE DETERMINATION PROGRAM, RECORDING MEDIUM, AND RESPONSE DETERMINATION SYSTEM

(75) Inventor: Hisanori Yamahara, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/503,583

(22) PCT Filed: Aug. 10, 2011

(86) PCT No.: PCT/JP2011/068248
§ 371 (c)(1),
(2), (4) Date: Apr. 23, 2012

(87) PCT Pub. No.: WO2012/029519
PCT Pub. Date: Mar. 8, 2012

(65) Prior Publication Data
US 2012/0210393 A1    Aug. 16, 2012

(30) Foreign Application Priority Data

Aug. 31, 2010   (JP) ................. 2010-193551
Aug. 31, 2010   (JP) ................. 2010-193552

(51) Int. Cl.
*G06F 7/04*     (2006.01)
*G06F 17/30*    (2006.01)
*G06F 21/00*    (2013.01)

(52) U.S. Cl.
CPC ........ *G06F 21/00* (2013.01); *G06F 2221/2133* (2013.01)
USPC .......................................................... 726/2

(58) Field of Classification Search
CPC .............................................. G06F 2221/2133
See application file for complete search history.

(56) References Cited

U.S. PATENT DOCUMENTS

| 7,917,508 B1 * | 3/2011 | Baluja et al. ................... 707/736 |
| 7,945,952 B1 * | 5/2011 | Behforooz ....................... 726/22 |
| 2009/0249477 A1 * | 10/2009 | Punera ............................ 726/18 |
| 2012/0023090 A1 * | 1/2012 | Holloway et al. ............. 707/709 |

FOREIGN PATENT DOCUMENTS

| JP | 08147428 A | 6/1996 |
| JP | 2001-188759 A | 7/2001 |
| JP | 2003-263417 A | 9/2003 |
| JP | 2005-128820 A | 5/2005 |
| JP | 2008-052727 A | 3/2008 |

OTHER PUBLICATIONS

Japanese Patent Office Action dated May 22, 2012 for JP 2012-509794 and English-language translation thereof.
Philip Brighten Godfrey, "Text-based CAPTCHA Algorithms," Dec. 15, 2001.

(Continued)

*Primary Examiner* — Andrew Nalven
*Assistant Examiner* — Quy Pham
(74) *Attorney, Agent, or Firm* — Sughrue Mion, PLLC

(57) ABSTRACT

The present invention includes: acquiring a question including text information and a correct answer to the question; converting part of a character string or character in the question into a different character string or character, and generating a character-converted question (42) corresponding to the question (S21); outputting information of the character-converted question to an output destination (S22); receiving an input of a response (43) to the character-converted question (S27); and determining whether or not the received response matches with the correct answer (S28).

9 Claims, 20 Drawing Sheets

(56) References Cited

OTHER PUBLICATIONS

Takumi Yamamoto, et al., "A Proposal of CAPTCHA using Strangeness in Machine Translation", IPSJ SIG Notes, Jul. 3, 2009, pp. 1-8, vol. 2009-CSEC-46, No. 37.

Hiroshi Yuki, "Kantan Jisso de Manabu Web Gijutsu 2007 Web Programming", Nikkei Software, May 24, 2007, pp. 122-129, vol. 10, No. 7.

Korean Office Action dated Jul. 9, 2013 issued in Korean Patent Application No. 10-2012-7017097 and English-language translation thereof.

Richard Bergmair, et al. Towards Human interactive Proofs in the Text-Domain Using the Problem of Sense-Ambiguity for Security; K. Zhang and Y. Zheng (eds), ISC 2004, LNCS 3225, pp. 257-267, Date: 2004.

* cited by examiner

FIG. 3

| QUESTION CODE | QUESTION | CHARACTER-CONVERTED QUESTION | CORRECT ANSWER | HINT | CATEGORY CODE | DIFFICULTY |
|---|---|---|---|---|---|---|
| 0000001 | とうきょう | とうきょう | とうきょう、東京・・・ | PLACE NAME | 001 | C |
| 0000002 | Tokyo | Tkoyo | Tokyo, tokyo・・・ | PLACE NAME | 001 | C |
| ・・・ | ・・・ | ・・・ | ・・・ | ・・・ | ・・・ | ・・・ |

FIG. 4

| QUESTION CODE | QUESTION | CHARACTER-CONVERTED QUESTION | CORRECT ANSWER | HINT | CATEGORY CODE | DIFFICULTY |
|---|---|---|---|---|---|---|
| 0001000 | きょうは なん にち です か? | きょうは なに んち です か? | $date | ... | 010 | C |
| 0001001 | What is the date today? | Waht is the date tadoy? | $date | ... | 010 | C |
| ... | | | | | | |

FIG. 5

| QUESTION CODE | QUESTION | CHARACTER-CONVERTED QUESTION | CORRECT ANSWER | HINT | CATEGORY CODE | DIFFICULTY |
|---|---|---|---|---|---|---|
| 0002000 | ねんしょうし ばくつ... | ねんしょうし ばくつは... | はなび、花火... | ... | 020 | B |
| 0002001 | A small container ... | A smlal contianer ... | firework | ... | 020 | B |
| ... | ... | ... | ... | ... | ... | ... |

FIG. 7

| USER ID | PASSWORD |
|---|---|
| 0000001 | ******** |
| 0000002 | ******** |

| ADDRESS | OCCUPATION |
|---|---|
| SINAGAWA-KU, TOKYO | COMPANY EMPLOYEE |
| SENDAI-SHI, MIYAGI | GOVERNMENT EMPLOYEE |

| CATEGORY CODE |
|---|
| 020、111 |
| 777 |

RESPONSE DETERMINATION APPARATUS, RESPONSE DETERMINATION METHOD, RESPONSE DETERMINATION PROGRAM, RECORDING MEDIUM, AND RESPONSE DETERMINATION SYSTEM

CROSS REFERENCE TO RELATED APPLICATIONS

This application is a National Stage of International Application No. PCT/JP2011/068248 filed Aug. 10, 2011, claiming priority based on Japanese Patent Application Nos. 2010-193551 and 2010-193552, filed Aug. 31, 2010, the contents of all of which are incorporated herein by reference in their entirety.

TECHNICAL FIELD

The present invention relates to a response determination apparatus that determines whether a response is generated by human or a computer, a response determination method, a response determination program, a recording medium, and a response determination system.

BACKGROUND ART

A completely automated public Turing test to tell computers and humans apart (CAPTCHA) technique has been used to prevent a large amount of user accounts from being generated by a computer, and to prevent a network load from increasing due to downloading of a large amount of data using a computer. For example, Patent Document 1 discloses a technique of disabling a computer to recognize characters by dynamically hiding the characters.

PRIOR ART DOCUMENT

Patent Document

Patent Document 1: Japanese Patent Application Laid-Open No. 2008-52727

SUMMARY OF THE INVENTION

Problems to be Solved by the Invention

However, in the above technique, since some of characters are screened, there was a problem in that it is difficult for human to explicitly visually recognize suggested characters and so legibility by human is lowered.

The present invention is made in light of the foregoing, and it is an object of the present invention to provide a response determination apparatus, a response determination method, a response determination program, a recording medium, and a response determination system, which are capable of implementing a CAPTCHA which is hardly recognized by computers without lowering legibility by humans.

Means for Solving the Problems

In order to solve the above problem, the invention described in claim 1 is characterized to include a question/correct answer acquiring means that acquires a question including text information and a correct answer to the question, a character-converted question generating means that converts part of a character string or character in the question into a different character string or character, and generates a character-converted question corresponding to the question, a character-converted question output means that outputs information of the character-converted question to an output destination, a response receiving means that receives an input of a response to the character-converted question, and a response determining means that determines whether or not the received response matches with the correct answer.

The invention described in claim 2 is characterized in that in the response determination apparatus described in claim 1, the response determination apparatus further includes a word acquiring means that acquires a word from the question, and the character-converted question generating means converts part of a character string or character configuring the acquired word into a different character string or character, and generates the character-converted question corresponding to the question using the converted character-converted word.

The invention described in claim 3 is characterized in that in the response determination apparatus described in claim 2, the question/correct answer acquiring means acquires a question sentence as the question, the word acquiring means acquires a word from the question sentence, and the character-converted question generating means generates the character-converted question by replacing the acquired word with the character-converted word in the question sentence.

The invention described in claim 4 is characterized in that in the response determination apparatus described in claim 2, the question/correct answer acquiring means acquires the word acquired by the word acquiring means as the correct answer to the question, the character-converted question generating means generates the character-converted word as the character-converted question, and the response determining means determines whether or not the received response matches with the word which is the correct answer.

The invention described in claim 5 is characterized in that in the response determination apparatus described in any one of claims 2 to 4, the response determination apparatus further includes a user information acquiring means that acquires user information of a user who responds to the character-converted question, and the word acquiring means acquires the word from the question of the question storing means based on the user information.

The invention described in claim 6 is characterized in that in the response determination apparatus described in any one of claims 1 to 5, the response determination apparatus further includes a question/correct answer generating means that generates at least one of the question and the correct answer to the question from the text information, and the question/response generating means generates the question from a search result on a search keyword in which the correct answer is used as the search keyword.

The invention described in claim 7 is characterized in that a response determination method of determining a response received by a response determination apparatus, includes a question/correct answer acquiring step of acquiring a question including text information and a correct answer to the question, a character-converted question generating step of converting part of a character string or character in the question into a different character string or character, and generating a character-converted question corresponding to the question, a character-converted question output step of outputting information of the character-converted question to an output destination, a response receiving step of receiving an input of a response to the character-converted question, and a response determining step of determining whether or not the received response matches with the correct answer.

The invention described in claim 8 is characterized by causing a computer to function as: a question/correct answer acquiring means that acquires a question including text information and a correct answer to the question; a character-converted question generating means that converts part of a character string or character in the question into a different character string or character, and generates a character-converted question corresponding to the question; a character-converted question output means that outputs information of the character-converted question to an output destination; a response receiving means that receives an input of a response to the character-converted question; and a response determining means that determines whether or not the received response matches with the correct answer.

The invention described in claim 9 is characterized by recording a response determination program causing a computer to function as: a question/correct answer acquiring means that acquires a question including text information and a correct answer to the question; a character-converted question generating means that converts part of a character string or character in the question into a different character string or character, and generates a character-converted question corresponding to the question; a character-converted question output means that outputs information of the character-converted question to an output destination; a response receiving means that receives an input of a response to the character-converted question; and a response determining means that determines whether or not the received response matches with the correct answer.

The invention according to an exemplary non-limiting embodiment is characterized in a response determination system including a terminal and a response determination apparatus that is connected to the terminal via a network and determines whether or not a response from the terminal is successful, which includes the response determination apparatus including a question/correct answer acquiring means that acquires a question including text information and a correct answer to the question, a character-converted question generating means that converts part of a character string or character in the question into a different character string or character, and generates a character-converted question corresponding to the question, a character-converted question output means that outputs information of the character-converted question to an output destination, a response receiving means that receives an input of a response to the character-converted question from the terminal, a response determining means that determines whether or not the received response matches with the correct answer, and a determination result transmitting means that transmits a determination result of the response determining means to the terminal.

Effect of the Invention

According to the present invention, by acquiring a question including text information and a correct answer to the question, converting part of a character string or character in the question into a different character string or character, generating a character-converted question corresponding to the question, outputting information of the character-converted question to an output destination, receiving an input of a response to the character-converted question, and determining whether or not the received response matches with the correct answer, since part of the character string of the word included in the question is converted into a different character string or character, a CAPTCHA can be implemented that is easily read by human as a word prior to the character conversion but is hardly recognized by a computer without lowering legibility by human.

BRIEF DESCRIPTION OF THE DRAWINGS

FIG. 3 is a schematic diagram illustrating an example of a question/correct answer table stored in a collation database illustrated in FIG. 2.

FIG. 4 is a schematic diagram illustrating an example of a question/correct answer table stored in the collation database illustrated in FIG. 2.

FIG. 5 is a schematic diagram illustrating an example of a question/correct answer table stored in the collation database illustrated in FIG. 2.

FIG. 7 is a schematic diagram illustrating an example of a user information table stored in a membership database illustrated in FIG. 6.

BEST MODES FOR CARRYING OUT THE INVENTION

Hereinafter, exemplary embodiments of the present invention will be described with reference to the accompanying drawings. Embodiments which will be described below are embodiments of an example in which the present invention is applied to a response determination system.

[1. Overview of Configuration and Function of Response Determination System]

First, a configuration and schematic function of a response determination system according to an embodiment of the present invention will be described using FIG. 1.

Figure 1:
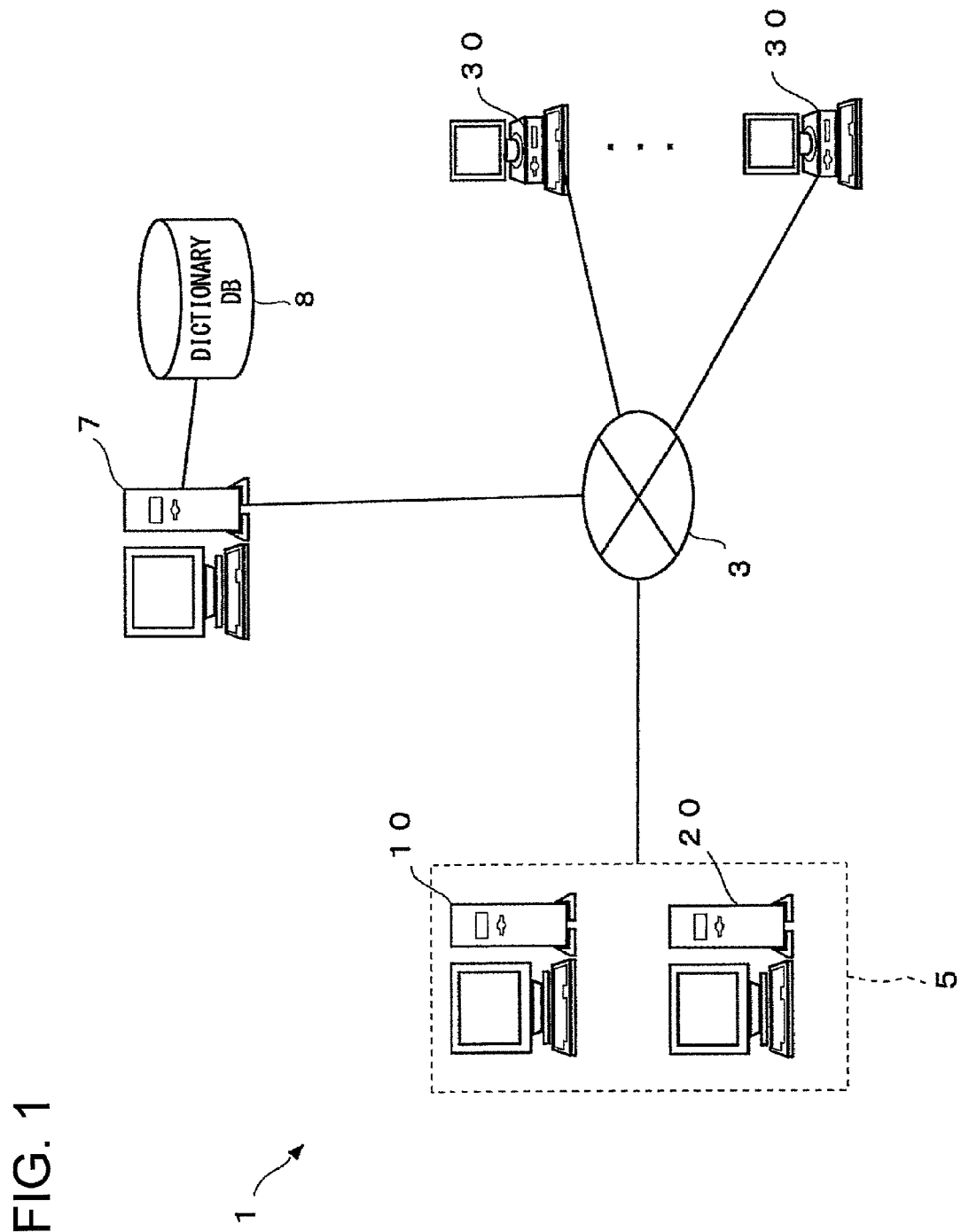
FIG. 1 is a schematic diagram illustrating a schematic configuration example of a response determination system according to an embodiment of the present invention.

FIG. 1 is a schematic diagram illustrating a schematic configuration example of a response determination system 1 according to the present embodiment.

As illustrated in FIG. 1, the response determination system 1 includes a response determination server (an example of a response determination apparatus) 10 that determines whether or not a response to a question given to a user is successful so as to authenticate the fact that an object who has attempted to access as the user is not a computer, a shopping server 20 installed to run a shopping site used by the user, and a terminal 30 (an example of a terminal) that displays a question for urging the user to input a response.

A server system (an example of the response determination apparatus) 5 is configured such that the response determination server 10 and the shopping server 20 are connected to each other by a local area network (LAN) or the like and are configured to perform transmission and reception of data with each other. The server system 5 and the terminal 30 are connected to each other via a network 3 and are configured to perform transmission and reception of data by a communication protocol (for example, transmission control protocol/Internet protocol (TCP/IP)). In addition, the network 3 is constructed with, for example, the Internet, a dedicated communication line (for example, a community antenna television (CATV) line), a mobile communication network (including a base station and the like), a gateway, or the like.

The response determination server 10 is connected to an external data search server 7 via the network 3. The data search server 7 includes a dictionary database (hereinafter, referred to as "dictionary DB") 8, and transmits a search result in response to a search query transmitted from the response determination server 10. For example, the data search server 7 transmits an explanatory sentence or the like in response to a search keyword included in the search query to the response determination server 10 as a search result with reference to the dictionary DB 8. Further, the data search server 7 transmits a search result of web pages including the search keyword to the response determination server 10 when the data search server 7 functions as a search engine on the Internet.

The response determination server 10 generates a character-converted question obtained by applying character conversion to a certain question as a question for determining whether or not a response is successful. The response determination server 10 transmits the character-converted question to the terminal 30 as a CAPTCHA, receives a response to the character-converted question from the terminal, and performs the determination.

Here, the character conversion refers to a process of converting part of a character string configuring a question word into a different character string or character with accordance with a predetermined rule. The character conversion may be performed such that characters in a word are switched, a character in a word is replaced with a character not included in the word, a character is added, or some of characters are deleted. For example, let us assume that the character conversion is performed on a character string "∇Δ□" which is part of a word "○∇Δ□". When characters are switched within a word, the character string "∇Δ□" may be converted into a character string "Δ∇□". When a character in a word is replaced with a character not included in the word, the character string "∇Δ□" may be converted into a character string "Δ●□". When a character is added, the character string "∇Δ□" may be converted into a character string "∇Δ□∇". Further, when the character "Δ" is deleted, the character string "∇Δ□" may be converted into a character string "∇□". When the character "∇" is further deleted, the character string "∇□" may be converted into a character "Δ".

It is desirable for the character conversion to allow the user to predict a word prior to the character conversion. As an example of the character conversion, a vowel may be replaced with another vowel, or a consonant may be replaced with another consonant. For example, "a" and "o", "y" and "I", "t" and "d", "m" and "n", "p" and "b", and the like may be replaced with each other. In the case of Japanese, "dakuten" (a voiced sound symbol) or "handakuten" (a semivoiced sound symbol) may be added or deleted like "は", "ば", and "ぱ".

Further, in the case of Japanese, characters "や" and "ゃ" representing "youon (contracted sound)" may be replaced with each other. Characters "つ" and "っ" representing "sokuon (doubled consonant)" may be replaced with each other. "とうきょう" may be converted into "とようきう", and "Tokyo" may be converted into "Tkoyo", "Takio", or the like. Further, a character may be added, and for example, "remember" may be converted to "rememnber". A character may be deleted, and for example, "remember" may be converted into "remeber".

Further, a restriction that the character conversion be applied to a word including 4 or more characters, a restriction that a first or last character of a word not be changed, a restriction that particles such as "は", "が", "に" be not changed, or the like may be added as the condition for applying the character conversion (or the condition for acquiring a word). Further, the character conversion may be performed only on words having the meaning, which are easily understood by many users, excluding technical terms based on a basic wordbook in which levels of words are classified according to the frequency of use, a degree of difficulty, or the like.

[2. Configuration and Function of Each Server]

(2.1 Configuration and Function of Response Determination Server 10)

Next, a configuration and function of the response determination server 10 will be described with reference to FIGS. 2 to 5.

Figure 2:
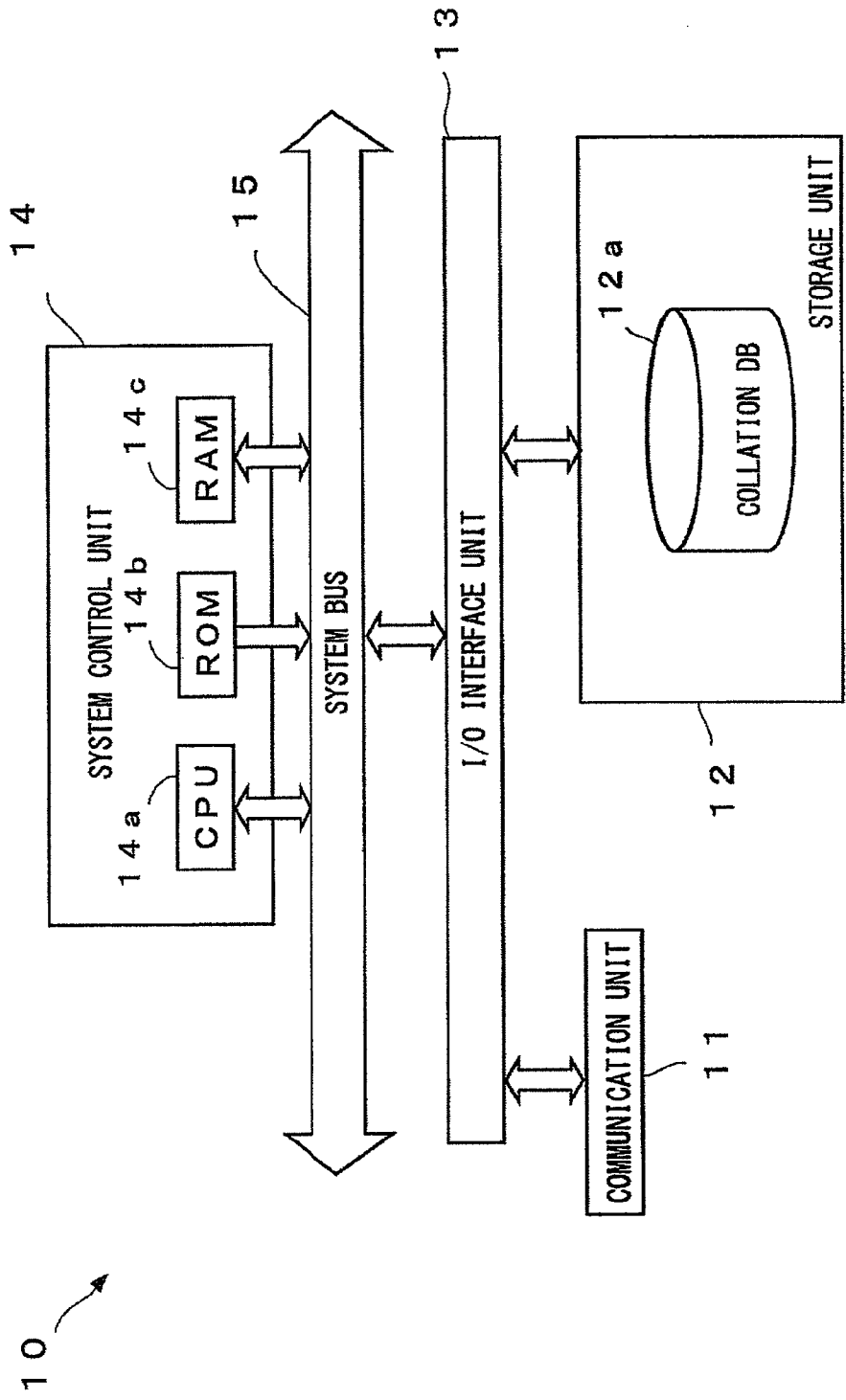
FIG. 2 is a block diagram illustrating an example of a schematic configuration of a response determination server illustrated in FIG. 1.

FIG. 2 is a block diagram illustrating an example of a schematic configuration of the response determination server 10. FIGS. 3 to 5 are schematic diagrams illustrating examples of question/correct answer tables stored in a collation database of the response determination server 10.

As illustrated in FIG. 2, the response determination server 10 functioning as a computer includes a communication unit 11, a storage unit 12, an input/output interface unit 13, and a system control unit 14. The system control unit 14 and input/output interface unit 13 are connected through a system bus 15.

The communication unit 11 is connected to the network 3, and controls a communication status with the terminal 30, the data search server 7 or the like. Further, the communication unit 11 is connected to the local area network, and performs transmission and reception of data with another server such as the shopping server 20 or the like on the local area network.

The storage unit 12 is configured, for example, with a hard disk drive, and stores various programs such as an operating system and a server program, data, and the like. In addition, for example, the various programs may be acquired through the network 3 from other server apparatuses or the like, or may be recorded in a recording medium and read through a drive device.

Further, a collation database (DB) 12*a* (hereinafter, referred to as "collation DB") that stores a question including text information, a correct answer to the question, and various sentences is constructed in the storage unit 12. As described above, the storage unit 12 functions as an example of a question storing means that stores a question including text information, a correct answer storing means that stores a correct answer to a question, and a sentence storing means that stores a sentence. Here, examples of the text information include a sentence, a word, and the like, and a word is configured, for example, with a character string, a character, or the like.

The collation DB 12*a* stores a question, a correct answer, a character-converted question obtained by converting part of a character string configuring a question word into a character string or a character, a hint about a question, a category of a question, and the difficulty of a question in association with a question code as illustrated in FIGS. 3 to 5. Further, the collation DB 12*a* stores a file of a web page for displaying a question for a response or for receiving a response, which is described in a markup language such as hypertext markup language (HTML), extensible markup language (XML), or the like. In addition, how to generate the tables of the collation DB 12*a* will be described later.

Next, the input/output interface unit 13 performs interface processing between the communication unit 11 and storage unit 12, and the system control unit 14.

The system control unit 14 is configured with a central processing unit (CPU) 14*a*, read only memory (ROM) 14*b*, random access memory (RAM) 14*c*, and the like. The system control unit 14 performs a determination process based on a response from the terminal 30 by reading and executing various programs stored in the ROM 14*b* or the storage unit 12 through the CPU 14*a*. The RAM 14*c* functions as an example of the question storing means that stores a question including text information, the correct answer storing means that stores a correct answer to the question, and the sentence storing means that stores a sentence.

(2.2 Configuration and Function of Shopping Server 20)

Next, a configuration and function of the shopping server 20 will be described using FIGS. 6 and 7.

Figure 6:
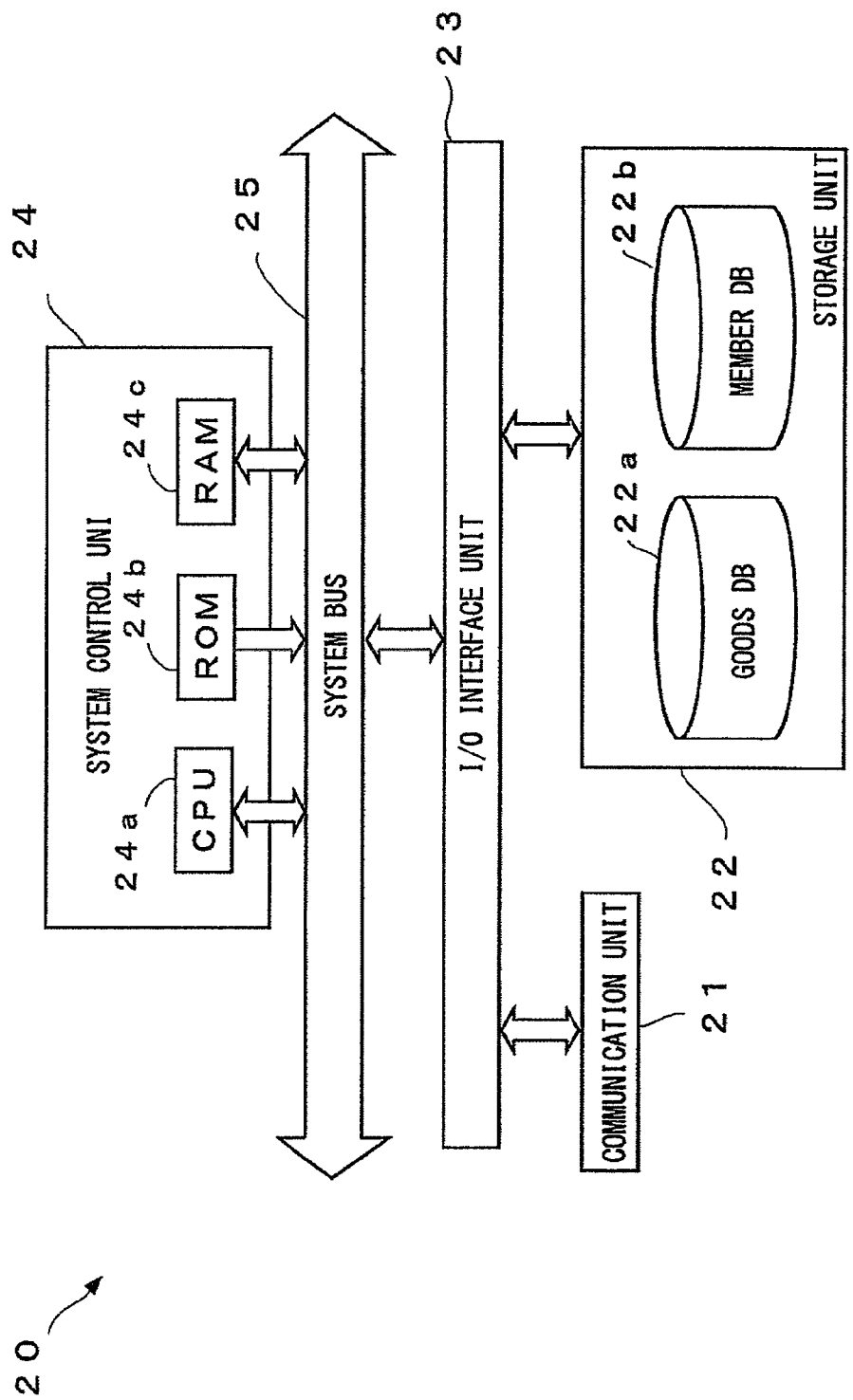
FIG. 6 is a block diagram illustrating an example of a schematic configuration of a shopping server illustrated in FIG. 1.

FIG. 6 is a block diagram illustrating an example of a schematic configuration of the shopping server 20. FIG. 7 is a schematic diagram illustrating an example of a user information table stored in a membership database of the shopping server 20.

As illustrated in FIG. 6, the shopping server 20 includes a communication unit 21, a storage unit 22, an input/output interface unit 23, and a system control unit 24. The system control unit 24 and the input/output interface unit 23 are connected via a system bus 25. In addition, the configuration and function of the shopping server 20 are substantially the same as the configuration and function of the response determination server 10, and therefore differences from each configuration and each function of the response determination server 10 will be mainly described.

The communication unit 21 controls a communication status with the terminal 30, the response determination server 10, or the like via the network 3, the local area network, or the like.

In the storage unit 22, a goods database (hereinafter, referred to as "goods DB") 22*a*, a member database (hereinafter, referred to as "member DB") 22*b*, and the like are constructed.

The goods DB 22*a* stores goods information such as a goods name, a kind, an image of goods, a specification, and a summary sentence for goods introduction, advertising information, and the like in association with a goods ID which is an identifier for identifying goods. Further, the goods DB 22*a* stores a file of a goods web page described in a markup language or the like such as HTML or XML.

In the member DB 22*b*, user information such as user IDs, names, telephone numbers, mail addresses, addresses, occupations, hobbies, purchase histories, and user's interested themes or genres of users registered as members (customers of the shopping site), is registered. Further, in the member DB 22*b*, a user ID, a long-in ID, and a password which are necessary when the user logs in the shopping site from the terminal 30 are registered. Here, the log-in ID and password are log-in information used for log-in processing (authentication processing of the user).

As illustrated in FIG. 7, the user information is constructed as a user information table in the member DB 22*b*, is identified by the user ID for each user, and is used in the condition for applying the character conversion, or the like. As illustrated in FIG. 7, a plurality of codes representing the user's hobby, the user's interested theme, and the like may be stored in a category code column.

The system control unit 24 is configured with a CPU 24*a*, ROM 24*b*, RAM 24*c*, and the like. Further, by CPU 24*a* reading and executing various programs stored in the ROM 24*b* and storage unit 22, the system control unit 24 causes a goods purchase process by the user or a goods purchase history to be recorded for each user ID.

(2.3 Configuration and Function of Terminal 30)

Next, a configuration and function of the terminal 30 will be described using FIG. 8.

Figure 8:
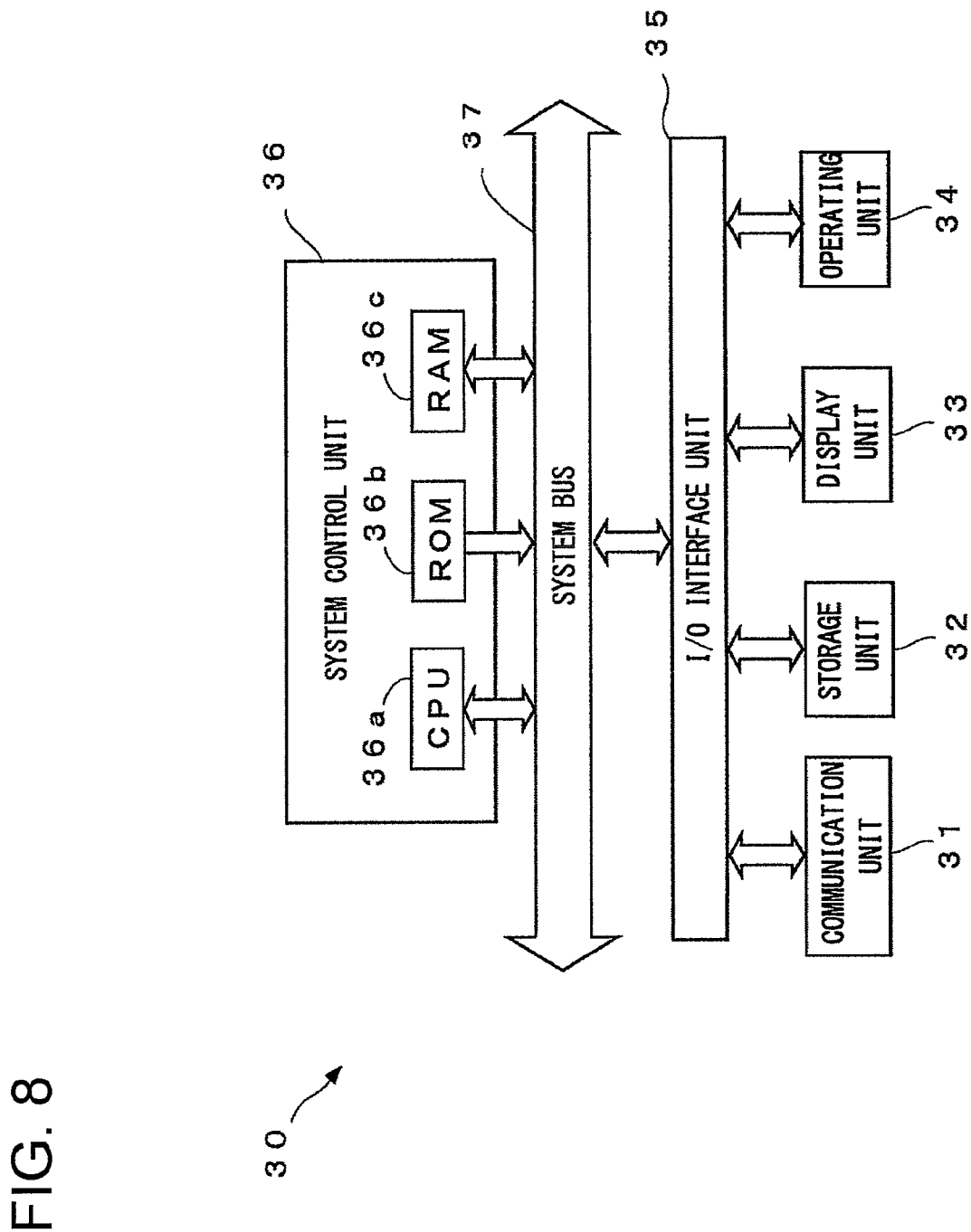
FIG. 8 is a block diagram illustrating an example of a schematic configuration of a terminal illustrated in FIG. 1.

FIG. 8 is a block diagram illustrating an example of a schematic configuration of the terminal 30.

As illustrated in FIG. 8, the terminal 30 functioning as a computer is a portable terminal such as a personal computer, a portable radio telephone, or a person digital assistant (PDA). The terminal 30 includes a communication unit 31, a storage unit 32, a display unit 33, an operating unit 34, an input/output interface unit 35, and a system control unit 36. The system control unit 36 is connected with the input/output interface unit 35 via a system bus 37.

The communication unit 31 controls communication with the response determination server 10 via the network 3. In addition, when the terminal 30 is a portable radio telephone, the communication unit 31 has a wireless communication function for a connection with a mobile communication network of the network 3.

The storage unit 32 includes, for example, a hard disk drive, and stores an operating system, a web browser program, and the like.

The display unit 33 is configured, for example, with a liquid crystal display (LCD) device, an electro luminescence (EL) device, or the like. The display unit 33 displays a web page or the like acquired from the response determination server 10.

The operating unit 34 includes, for example, a keyboard, a mouse, and the like. The user inputs a response through the operating unit 34. In addition, in the case in which the display unit 33 is a display panel of a touch switch type such as a touch panel, the operating unit 34 acquires position information of a pressed part on which a screen of the display unit 33 is pressed down.

The input/output interface unit 35 functions as an interface between the communication unit 31 and the system control unit 36 and an interface between the storage unit 32 and the system control unit 36.

The system control unit 36 includes, for example, a CPU 36a, ROM 36b, and RAM 36c. The system control unit 36 reads and executes various programs stored in the ROM 36b, the RAM 36c, or the storage unit 32 through the CPU 36a.

[3. Operation of Response Determination System According to First Embodiment]

(3.1 Construction of Collation DB 12a)

A method of constructing the collation DB 12a in the response determination system 1 according to an embodiment of the present invention will be described using FIGS. 3 to 4 and FIG. 9.

Figure 9:
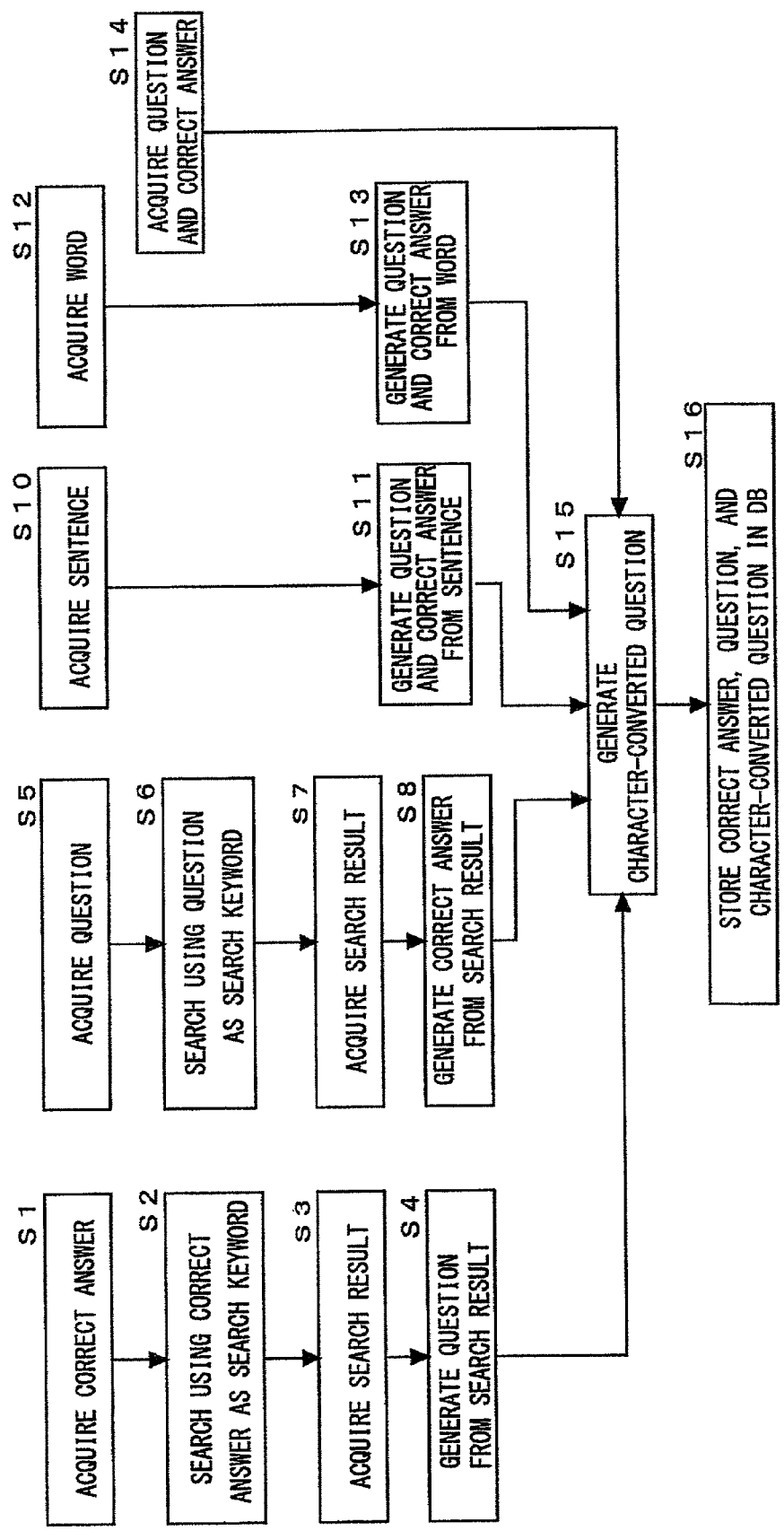
FIG. 9 is a block diagram illustrating a process of constructing a database in the response determination system of FIG. 1.

FIG. 9 is a block diagram illustrating a process of constructing a database in the response determination system 1.

A method of constructing a database including a set of a question prior to the character conversion, a correct answer to the question, and a character-converted question shown to the user will be described in connection with (1) a method of generating a question from a correct answer (steps S1 to S4, S15, and S16), (2) a method of generating a correct answer from a question (steps S5 to 8, S15, and S16), (3) a method of generating a question and a correct answer from a sentence (steps S10, S11, S15, and S16), (4) a method of generating a question and a correct answer from a word (steps S12, S13, S15, and S16), and (5) a method of acquiring a question and a correct answer which have been prepared in advance (steps S14, S15, and S16).

First, a description will be made in connection with (1) the method of generating the question from the correct answer. As illustrated in FIG. 9, the response determination server 10 acquires a correct answer (step S1). Specifically, the system control unit 14 of the response determination server 10 receives a word or the like such as "花火" or "firework" from an input means (not shown) as a correct answer, as an example of a question/correct answer acquiring means that acquires a question including text information, and a correct answer to the question, or reads a correct answer of a word or the like previously stored in the storage unit 12 functioning as an example of the correct answer storing means that stores a correct answer to a question. As described above, by acquiring the correct answer which is text information, the system control unit 14 of the response determination server 10 functions as an example of the question/correct answer acquiring means that acquires a question including text information, and a correct answer to the question.

Next, the response determination server 10 performs a search using the correct answer as a search keyword (step S2). Specifically, the system control unit 14 of the response determination server 10 generates a search query in which the correct answer is used as the search keyword, and transmits the search query to the data search server 7 via the communication unit 11. The data search server 7 performs a search with reference to the dictionary DB 8, and transmits a search result on the search keyword to the response determination server 10.

Next, the response determination server 10 acquires the search result (step S3). Specifically, the system control unit 14 of the response determination server 10 receives the search result on the search keyword from the data search server 7. For example, the system control unit 14 of the response determination server 10 acquires a definition or a translation of "花火", an explanatory sentence of "花火" such as "燃焼し爆 発する粉末を包 んだもの ...", or the like as the search result on "花 火" Further, when there is information of a category to which a word "花火" or "firework" belongs to, category information is also acquired.

Further, when the correct answer is an English word like "firework", the system control unit 14 of the response determination server 10 acquires the search result including "a small container filled with powder that burn ... " or the like. Further, when the data search server 7 functions as the search engine on the Internet, the response determination server 10 acquires information about a web page including the search keyword as the search result.

Next, the response determination server 10 generates a question including text information from the search result (step S4). Specifically, when a definition or explanatory sentence of the search keyword such as "花火" is acquired as the search result, the system control unit 14 of the response determination server 10 parses the sentence, delimits segments or the like, inserts a space into delimiters, and converts kanji characters into hiragana characters or katakana characters, as an example of a question/correct answer generating means. For example, the system control unit 14 of the response determination server 10 delimits a sentence "燃焼し爆発する粉 末を . . . " to obtain "燃焼し 爆発する 粉末を . . . ", and further converts "燃焼し 爆発する 粉末を . . . " into a hiragana sentence like "ねんし ょうし ばくはつする ふんまつを ...".

In addition, in case of an English sentence, for example, the system control unit 14 of the response determination server 10 uses the sentence "a small container filled with powder that burns ... " as the question as-is. By generating the question from the search result, the system control unit 14 of the response determination server 10 functions as an example of the question/correct answer acquiring means that acquires the question including the text information, and the correct answer to the question.

Further, when the information about the web page including the search keyword is acquired, the system control unit 14 of the response determination server 10 selects a web page of a site having a dictionary function from searched web pages, or extracts a sentence of a part corresponding to an explanatory sentence of a keyword or a sentence of a snippet part from web pages hit at high rankings.

Next, the response determination server 10 generates the character-converted question (step S15). Specifically, the system control unit 14 of the response determination server 10 performs the character conversion on the word included in the question sentence or the like as an example of a character converting means, and generates a character-converted word. For example, the system control unit 14 of the response determination server 10 generates a character-converted word "ねんよしうし" by switching "し" and "よ" in "ねんしょうし", and generates a character-converted word "ばくつはする" by switching "は" and "つ" in "ばくつはする". Further, the system control unit 14 of the response determination server 10 generates a character-converted word "smlal" by switching "a" and "l" in "small", and generates "contianer" by switching "i" and "a" in "container". In addition, in the case of Japanese, a segment "ねんしょうし" may be dealt as a word.

The system control unit 14 of the response determination server 10 generates a character-converted question by replacing the word acquired in the question sentence with the character-converted word as an example of a character-converted question generating means. For example, the system control unit 14 of the response determination server 10 generates a character-converted question sentence "ねんょしうし ばくつはする ふんつまを つつだんものを . . . " by performing a process of replacing the word "ねんしょうし" with the character-converted word "ねん ょしうし", replacing the word "ばくつはする" with the character-converted word "ばくつはする", and the like on the question sentence "ねんしょうし ばくはつする ふんまつを . . .". At this time, a word order of words in the sentence does not change. In the case of English, the system control unit 14 of the response determination server 10 generates a character-converted question sentence "A smlal contianer fliled with pwoder taht bruns . . . " by performing a process of replacing the word "small" with the character-converted word "smlal", replacing the word "container" with the character-converted word "contianer", and the like on the question sentence "A small container filled with powder that burns . . . ". As described above, the system control unit 14 of the response determination server 10 generates the character-converted question corresponding to the question using the converted character-converted word.

Next, the response determination server 10 stores the correct answer, the question, and the character-converted question in the collation DB 12a (step S16). Specifically, the system control unit 14 of the response determination server 10 allocates a question code to each question, and stores the correct answer, the question, and the character-converted question in a table of the collation DB 12a as illustrated in FIG. 5, as an example of the question storing means and a correct answer storing means. The system control unit 14 of the response determination server 10 may store not only the input correct answer "花火" but also "はなび", "煙火", "ハナビ"", "hanabi", "firework", "FIREWORK", "fireworks" or the like in the collation DB 12a as another correct answer.

In addition, as to a question category, a category code is allocated to each category such as science, literature, and history, and the system control unit 14 of the response determination server 10 decides the category code based on a category to which a term of a correct answer belongs to. The category to which the term of the correct answer belongs to may be decided by acquiring category information from the dictionary DB 8 at the time of a search, or may be decided based on a category dictionary previously stored in the storage unit 12. For the difficulty of the question, the system control unit 14 of the response determination server 10 may decide the difficulty of the question based on the length of a question sentence or the category. Alternatively, the difficulty of the question may be decided for each user, based on the user information in the member DB 22b. Further, the system control unit 14 of the response determination server 10 may generate a hint from a category name or the like.

In addition, when the collation DB 12a is constructed, the response determination server 10 may not generate the character-converted question by skipping step S15. In this case, a portion of the character-converted question in the table of the collation DB 12a may remain blank.

Next, a description will be made in connection with (2) the method of generating the correct answer from the question.

The response determination server 10 acquires a question including text information (step S5). Specifically, the system control unit 14 of the response determination server 10 acquires a word such as "アップル" or "apple", a sentence, or the like, by receiving input from an input means (not shown) as a question, or by reading a question of a word, a sentence, or the like previously stored in the storage unit 12 functioning as an example of the question storing means that stores a question including text information. By acquiring the question, the system control unit 14 of the response determination server 10 functions as an example of the question/correct answer acquiring means that acquires a question including text information, and a correct answer to the question.

Next, the response determination server 10 performs a search using the question as a search keyword (step S6). Specifically, the system control unit 14 of the response determination server 10 generates a search query in which a word such as "アップル" or "apple" as the question is used as the search keyword, and transmits the search query to the data search server 7 via the communication unit 11. The data search server 7 performs the search with reference to the dictionary DB 8, and transmits a search result on the search keyword to the response determination server 10. In addition, the response determination server 10 may perform the search by additionally using another keyword such as "アップル 連想".

Next, the response determination server 10 acquires the search result (step S7). Specifically, the system control unit 14 of the response determination server 10 receives the search result on the search keyword from the data search server 7. A search result including a synonym, an association word, a translation, a definition or explanatory sentence of "アップ ル" or "apple", or the like may be acquired as the search result on "アップル" or "apple". "赤い", "丸い", "リンゴ", and the like are obtained for "アップル", and "red", "round", "pomme", and the like are obtained for "apple". Further, when there is information of a category to which a word "アップル" or "apple" belongs, the category information is also acquired.

Next, the response determination server 10 generates a correct answer from the search result (step S8). Specifically, the system control unit 14 of the response determination server 10 selects a certain word from the search result as a correct answer, as an example of the question/correct answer generating means. For example, the system control unit 14 of the response determination server 10 uses "赤い", "丸い", "リンゴ", or the like as a correct answer on "アップル" and uses "red", "round", "pomme", or the like as a correct answer on "apple". As described above, by generating the correct answer from the search result, the system control unit 14 of the response determination server 10 functions as an example of the question/correct answer acquiring means that acquires a question including text information and a correct answer to the question.

Further, when the search result is a sentence, a word having a high frequency or the like may be used as the correct answer by parsing the sentence, or the correct answer may be derived by performing semantic analysis on the question sentence. In addition, when information related to the web page including the search keyword is acquired, the system control unit 14 of the response determination server 10 specifies a correct answer target sentence by selecting a sentence of a site having a dictionary function from searched web pages, or extracting a sentence of a part corresponding to an explanatory sentence of a keyword or a sentence of a snippet part from web pages hit at high rankings.

Next, in step S15, the response determination server 10 generates a character-converted question. Specifically, the system control unit 14 of the response determination server 10 performs the character conversion on the word included in the question sentence or the like, and generates a character-converted word. For example, the system control unit 14 of the response determination server 10 converts a word "アップル" into a character-converted word "アップル". The system control unit 14 of the response determination server 10 uses the character-converted word "アップル" as the character-converted question.

Next, in step S16, the response determination server 10 stores the correct answer, the question, and the character-converted question in the collation DB 12a.

Next, a description will be made in connection with (3) the method of generating the question and the correct answer from the sentence.

The response determination server 10 acquires a sentence (step S10). For example, the system control unit 14 of the response determination server 10 acquires a sentence, such as "今日の 天気は快晴です。" or "Today's weather is sunny.", by receiving input from an input means (not shown), by reading a sentence previously stored in the storage unit 12, or by acquiring a sentence via the network 3, as an example of the question/correct answer acquiring means. In addition, when the sentence is "今日の 天気は快晴です。", the system control unit 14 of the response determination server 10 acquires the sentence from a weather-related site. Further, when the sentence is "今日の天気は快晴です。", since the correct answer changes from day to day, the correct answer may be updated each time when the weather changes.

Next, the response determination server 10 generates a question and a correct answer from the sentence (step S11). Specifically, the system control unit 14 of the response determination server 10 parses the acquired sentence and separates the sentence into "今日の天気は" and "快晴です", generates a question sentence such as "きょうの てんきは ?" from "今日の天気は", and generates a correct answer such as "快晴" from "快晴です", as an example of the question/correct answer generating means. Further, when the sentence is "Today's weather is sunny.", the system control unit 14 of the response determination server 10 separates the sentence into a subject "Today's weather" and a complement "sunny", generates a question sentence such as "Today's weather?" from the subject "Today's weather", and generates a correct answer such as "sunny" from the complement "sunny".

In addition, the system control unit 14 of the response determination server 10 may uses "晴れ", "clear", or the like as the correct answer with reference to a synonym dictionary database. Further, to the extent that human and a machine can be discriminated, the system control unit 14 of the response determination server 10 may use "雨", "rainy", "曇り", "cloudy", or the like as the correct answer regardless of an actual weather. As described above, by generating the question from the sentence, the system control unit 14 of the response determination server 10 functions as an example of the question/correct answer acquiring means that acquires a question including text information and a correct answer to the question. Further, by generating the correct answer from the sentence, the system control unit 14 of the response determination server 10 functions as an example of the question/correct answer acquiring means that acquires a question including text information and a correct answer to the question.

Next, in step S15, the response determination server 10 generates a character-converted question. In step S16, the response determination server 10 stores the correct answer, the question, and the character-converted question in the collation DB 12a. For example, the system control unit 14 of the response determination server 10 generates the character-converted question "きうょの てきんは ?" from the question "きょうの てんき は?", or generates the character-converted question "Tadoy's waether?" or the like from the question "Today's weather?".

Next, a description will be made in connection with (4) the method of generating the question and the correct answer from the word.

The response determination server 10 acquires a word (step S12). Specifically, the system control unit 14 of the response determination server 10 receives a word, such as "東 京" or "Tokyo", input from an input means (not shown) or reads a word from the storage unit 12 or the like, as an example of the question/correct answer acquiring means or an example of a word acquiring means.

The response determination server 10 generates a question and a correct answer from the word (step S13). Specifically, the system control unit 14 of the response determination server 10 uses the acquired word as the question as-is, converts the acquired word into a hiragana character or a katakana character and uses the hiragana character or the katakana character as the question when the word includes a kanji character, as an example of the question/correct answer generating means. A correct answer is generated from the acquired word in the same manner. In the case of an English word, the system control unit 14 of the response determination server 10 uses the word as the question and the correct answer as-is. As described above, by generating the question from the word including text information, the system control unit 14 of the response determination server 10 functions as an example of the question/correct answer acquiring means that acquires a question including text information and a correct answer to the question. Further, by generating the correct answer from the word including text information, the system control unit 14 of the response determination server 10 functions as an example of the question/correct answer acquiring means that acquires a question including text information and a correct answer to the question.

Next, in step S15, the response determination server 10 generates a character-converted question "とようきう" from the question "とうきょう", or generates a character-converted question "Tkoyo" from the question "Tokyo".

Next, in step S16, the response determination server 10 stores the correct answer, the question, and the character-converted question in the collation DB 12a and thus constructs a table illustrated in FIG. 3.

Next, a description will be made in connection with (5) the method of acquiring the question and the correct answer which have been prepared in advance.

The response determination server 10 acquires a question and a correct answer (step S14). Specifically, the system control unit 14 of the response determination server 10 receives a question and a correct answer from an input means (not shown) or reads a question and a correct answer from the storage unit 12 or the like as an example of the question/correct answer acquiring means. For example, the system control unit 14 of the response determination server 10 acquires a question "きょうは なんにち です か?" or "What is the date today?" and a function "$ date" that calls a date of today or the like as the correct answer. As described above, by acquiring a question including text information and setting the acquired question as the question, the system control unit 14 of the response determination server 10 functions as an example of the question/correct answer acquiring means that acquires a question including text information and a correct answer to the question. Further, by acquiring a correct answer including text information and setting the acquired correct answer as the correct answer, the system control unit 14 of the response determination server 10 functions as an example of the question/correct answer acquiring means that acquires a question including text information and a correct answer to the question.

Next, in step S15, the response determination server 10 generates a character-converted question "きょよは なにんち で です か?" from the question.

Next, in step S16, the response determination server 10 stores the correct answer, the question, and the character-converted question in the collation DB 12a and thus constructs a table illustrated in FIG. 4. In addition, when the question is the same as the correct answer, he system control unit 14 of the response determination server 10 acquires only the question, and stores the question which has not been subjected to the character conversion as the correct answer in the collation DB 12a.

(3.2 Operation of Response Determination System 1)

Next, an operation of the response determination system 1 according to an embodiment of the present invention will be described based on FIGS. 10 and 11.

Figure 10:
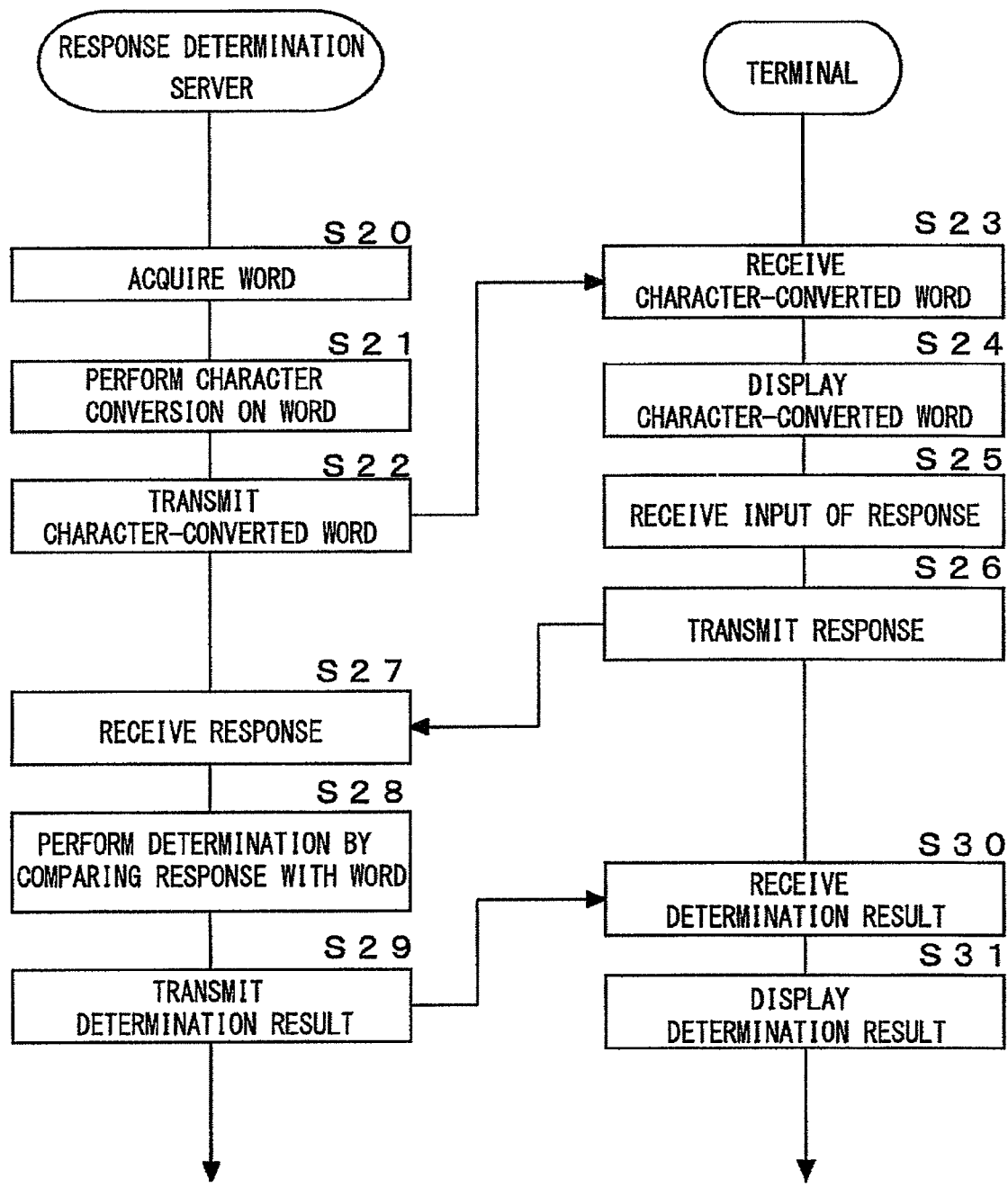
FIG. 10 is a sequence diagram illustrating an operation example of the response determination system of FIG. 1 according to a first embodiment.
Figure 11A:
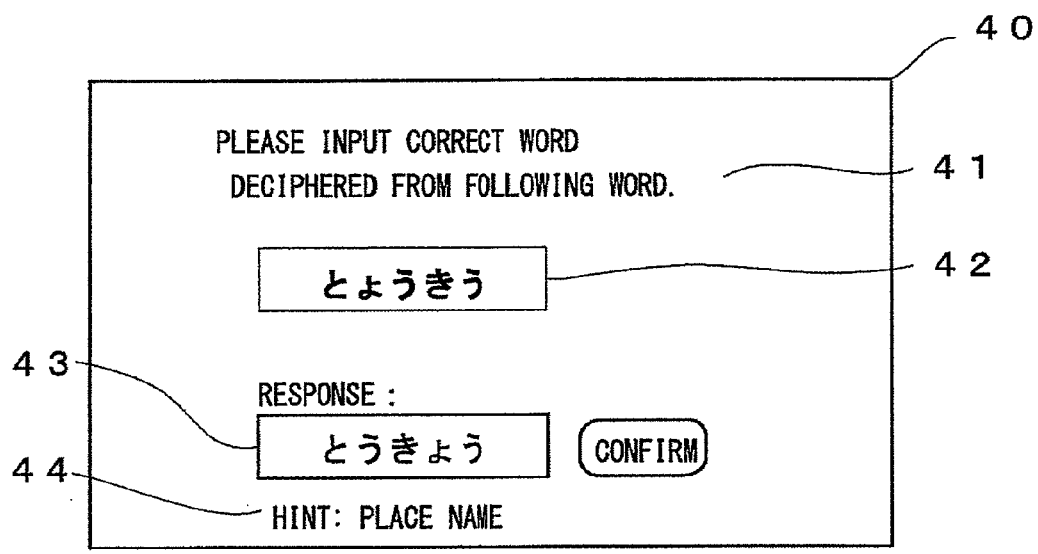
FIGS. 11A and 11B are schematic diagrams illustrating examples of a character-converted question and a response displayed on the terminal illustrated in FIG. 1.
Figure 11B:
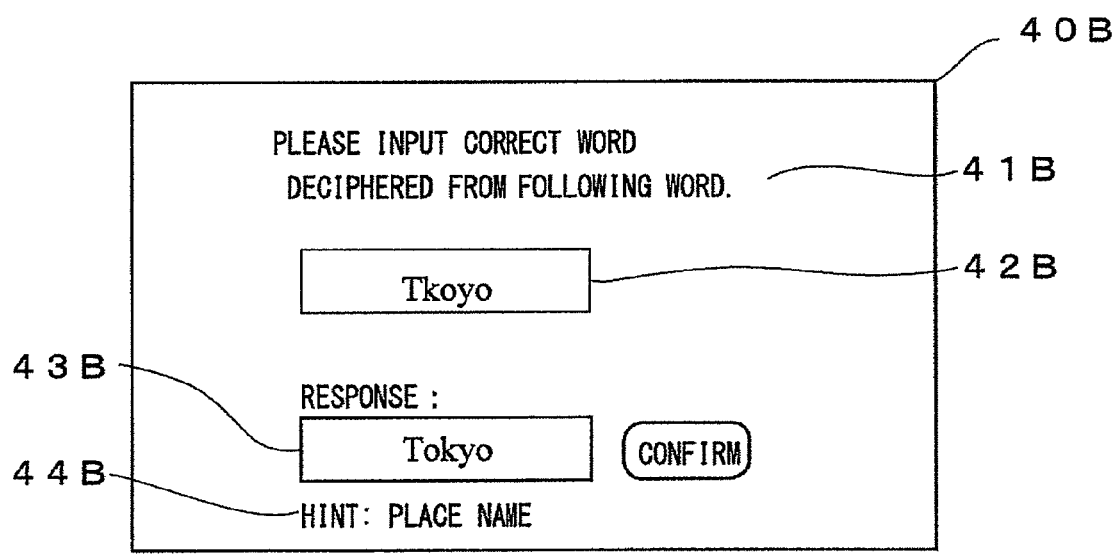

FIG. 10 is a sequence diagram illustrating an operation example of the response determination system 1. FIGS. 11A and 11B are schematic diagrams illustrating examples of a character-converted question and a response displayed on the terminal 30.

Here, a description will be made in connection with an example in which CAPTCHA authentication is requested in order that the response determination server 10 permits the submission of the goods review and writing is completed when a user writes a goods review in a shopping site of the shopping server 20 and then clicks a writing confirm button.

First, an acceptance request of goods review writing in the shopping site is transmitted from the terminal 30 to the shopping server 20. The shopping server 20 transmits a CAPTCHA authentication signal to the response determination server 10.

Next, as illustrated in FIG. 10, the response determination server 10 acquires a word from the collation DB 12a (step S20). Specifically, the system control unit 14 of the response determination server 10 acquires a question word such as "とうきょう" or "Tokyo" from a question column of the table illustrated in FIG. 3 together with a question code, as an example of the question/correct answer acquiring means or an example of the word acquiring means that acquires a word from a question. As described above, by acquiring a word including text information and setting the word as the question, the system control unit 14 of the response determination server 10 functions as an example of the question/correct answer acquiring means that acquires a question including text information and a correct answer to the question.

In addition, when the correct answer does not remain stored in the collation DB 12a, the system control unit 14 of the response determination server 10 may stores the acquired word in the collation DB 12a as the correct answer to the question. As described above, by acquiring a word including text information and setting the word as the correct answer, the system control unit 14 of the response determination server 10 functions as an example of the question/correct answer acquiring means that acquires a question including text information and a correct answer to the question.

Next, the response determination server 10 performs the character conversion on the acquired word (step S21). Specifically, the system control unit 14 of the response determination server 10 converts part of a character string configuring the acquired word into a different character string or character as an example of the character converting means. For example, the system control unit 14 of the response determination server 10 generates a character-converted word "とようきう" by switching "う" and "ょ" in "とうきょう", and generates a character-converted word "Tkoyo" by switching "o" and "k" in "Tokyo". Here, since the character-converted word is a character-converted question corresponding to the question, the system control unit 14 of the response determination server 10 functions as an example of the character-converted question generating means that generates a character-converted word as a character-converted question.

Next, when a character-converted question column of the collation DB 12a is blank or when the same character-converted word is not present, the system control unit 14 of the response determination server 10 may stores the character-converted word in the collation DB 12a so that the character-converted word can be easily reused.

Next, the response determination server 10 transmits the character-converted word (step S22). Specifically, the system control unit 14 of the response determination server 10 transmits information related to the character-converted word to the terminal 30 in a web page form via the communication unit 11 as an example of a character-converted question output means. Here, the terminal 30 is an example of the output destination to which information of the character-converted question is output.

In addition, when the character-converted question is already present in the collation DB 12a, the system control unit 14 of the response determination server 10 may skip steps S20 and S21, read the character-converted word from the character-converted question column of the collation DB 12a, and transmit the read character-converted word to the terminal 30. Further, the information related to the character-converted word to output may be text data or image data which has been subjected to imaging.

Next, the terminal 30 receives the character-converted word (step S23). Specifically, the system control unit 36 of the terminal 30 receives the information related to the character-converted word from the response determination server 10 via the communication unit 31.

Next, the terminal 30 displays the character-converted word (step S24). Specifically, the system control unit 36 of the terminal 30 displays a web page 40 or 40B for performing CAPTCHA authentication for goods review writing permission on the display unit 33 as illustrated in FIG. 11A or 11B.

The character-converted word "とようきう" or the character-converted word "Tkoyo" which is an example of the character-converted question is displayed on the web page 40 or 40B.

Here, the web pages 40 and 40B include instruction sentence columns 41 and 41B in which an instruction on the question is stated, question display frames 42 and 42B in which the character-converted question is displayed, response writing columns 43 and 43B in which the user writes a response, and hint columns 44 and 44B in which a hint for responding to the question is written.

A sentence of an instruction on how to respond to the displayed character-converted question is displayed on the instruction sentence columns 41 and 41B. For example, a sentence for urging the user to input a response to a question such as "Please input correct word deciphered from following word." is displayed on the instruction sentence columns 41 and 41B.

The character-converted question received from the response determination server 10 is displayed on the question display frame 42 or 42B as a CAPTCHA. The response writing columns 43 and 43B are initially blank, and the user inputs a response to the response writing columns 43 and 43B.

A hint that allows the user to easily recognize, easily see, and easily respond to the character-converted question is displayed on the hint columns 44 and 44B. For example, "place name" is displayed on the hint columns 44 and 44B as the hint. The web pages 40 and 40B may be described in a hyper text markup language (HTML) or the like so that the system control unit 36 of the terminal 30 can display the hint only when the user clicks a hint request button.

Next, the terminal 30 receives an input of a response (step S25). Specifically, the system control unit 36 of the terminal 30 causes the response which the user has input through the operating unit 34 to be displayed on the response writing column 43 or 43B of the display unit 33. For example, the system control unit 36 of the terminal 30 receives an input of a response including text information such as "とうきょう" of the response writing column 43 or "Tokyo" of the response writing column 43B.

Next, the terminal 30 transmits the response (step S26). Specifically, the system control unit 36 of the terminal 30 transmits information of the responses input to the response writing column 43 or 43B to the response determination server 10 via the communication unit 31 when a confirm button displayed on the web page 40 or 40B is clicked.

Next, the response determination server 10 receives the response (step S27). Specifically, the system control unit 14 of the response determination server 10 receives the response from the terminal 30 via the communication unit 11 as an example of a response receiving means that receives a response to the character-converted question.

Next, the response determination server 10 compares the word with the response and determines whether or not the response is the correct answer (step S28). Specifically, the system control unit 14 of the response determination server 10 reads the word of the correct answer corresponding to the question from the correct answer column of the collation DB 12a using the question code with reference to the collation DB 12a, and determines whether or not the received response matches with the read word, as an example of a response determining means. When the question is "とうきょう", a kanji character such as "東京", an English word such as "Tokyo", or the like as well as "とうきょう" may be used as the correct answer. Here, when it is determined that the read word matches with the received response, it is regarded as a correct answer, whereas when it is determined that the read word does not match with the received response, it is regarded as an incorrect answer.

In addition, the system control unit 14 of the response determination server 10 may store the word acquired in step S1 in the RAM 14c as the correct answer, and perform the determination by comparing the received response with the stored word.

Next, the response determination server 10 transmits the determination result (step S29). Specifically, the system control unit 14 of the response determination server 10 transmits the determination result to the terminal 30 via the communication unit 11. When the received response is the correct answer, the system control unit 14 of the response determination server 10 transmits data of an access permission screen or data of a next step screen such as a purchase screen. As described above, the system control unit 14 of the response determination server 10 functions as an example of a determination result transmitting means that transmits the determination result to the terminal.

Next, the terminal 30 receives the determination result (step S30). Specifically, the system control unit 36 of the terminal 30 receives the determination result from the response determination server 10 via the communication unit 31.

Next, the terminal 30 displays the determination result (step S31). Specifically, the system control unit 36 of the terminal 30 displays a goods review writing completion screen on the display unit 33 as the determination result.

(3.3 Modified Example of Operation of Response Determination System 1)

Next, a modified example of an operation of the response determination system 1 according to an embodiment of the present invention will be described using FIGS. 12 to 16.

Figure 12:
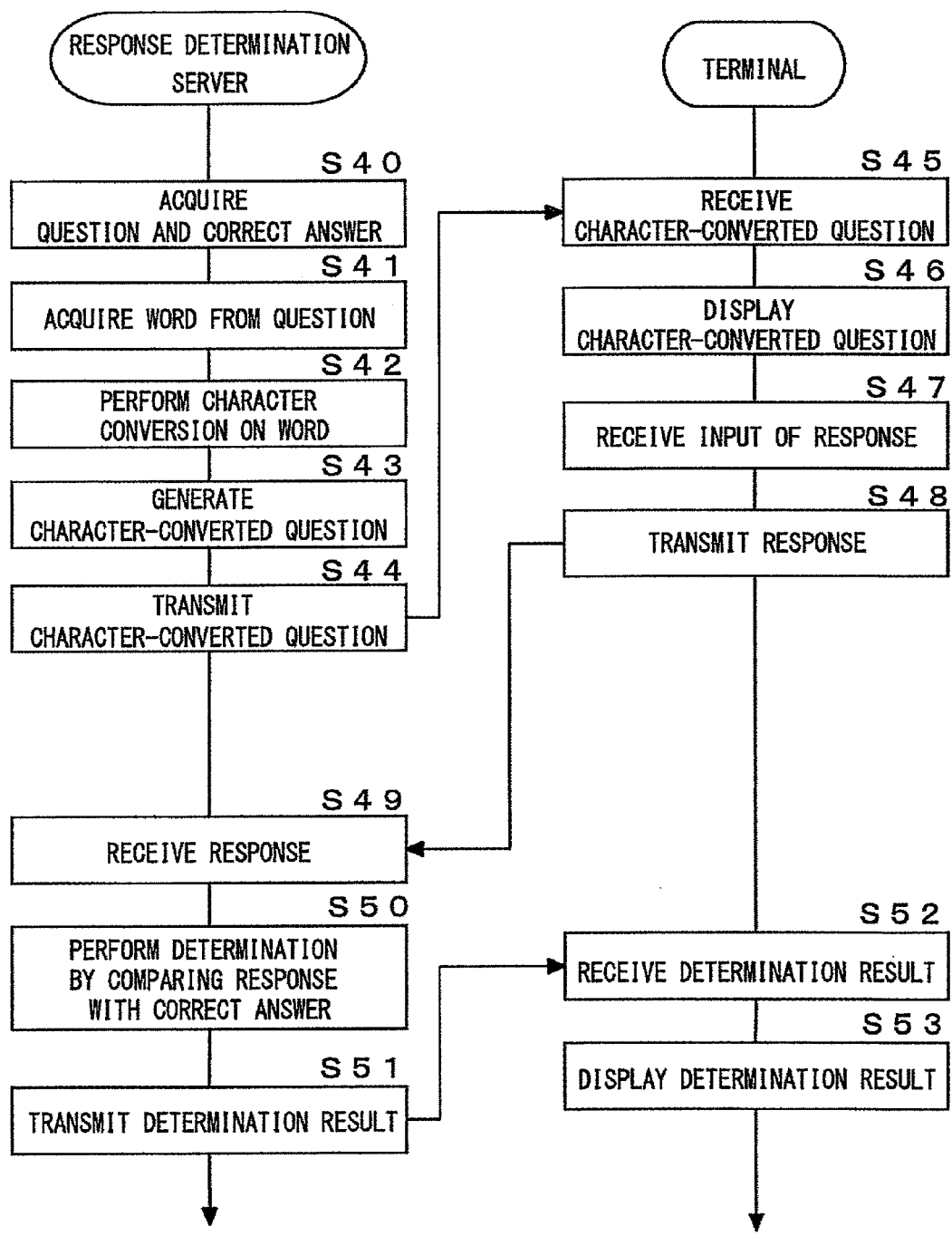
FIG. 12 is a sequence diagram illustrating a modified example of an operation of the response determination system of FIG. 1 according to the first embodiment.

FIG. 12 is a sequence diagram illustrating a modified example of an operation of the response determination system 1. FIGS. 13A and 13B to FIGS. 16A and 16B are schematic diagrams illustrating examples of a character-converted question and a response displayed on the terminal 30.

As illustrated in FIG. 12, the response determination server 10 acquires a question and a correct answer (step S40). Specifically, the system control unit 14 of the response determination server 10 acquires a question of a sentence or a question of a word as an example of a question including text information, and a correct answer corresponding to the question using the question code with reference to the collation DB 12a, as an example of the question/correct answer acquiring means, and stores the question and the correct answer in the RAM 14c. Further, the system control unit 14 of the response determination server 10 may acquire another correct answer when there is another correct answer.

As described above, by acquiring a question of text information and setting the acquired question as the question, the system control unit 14 of the response determination server 10 functions as an example of the question/correct answer acquiring means that acquires a question including text information and a correct answer to the question. Further, by acquiring a correct answer of text information and setting the acquired correct answer as the correct answer, the system control unit 14 of the response determination server 10 functions as an example of the question/correct answer acquiring means that acquires a question including text information and a correct answer to the question.

The response determination server 10 acquires a word from the question (step S41). Specifically, when the question is a sentence, the system control unit 14 of the response determination server 10 acquires a word that satisfies the condition of 4 or more characters or the like based on the condition for applying the character conversion as an example of the word acquiring means. For example, the system control unit 14 of the response determination server 10 acquires words "きょうは" and "なんにち" from a question sentence "きょうは な んにち です か?". In addition, for example, when a question sentence is "What is the date today?", the system control unit 14 of the response determination server 10 acquires words "what" and "today". Further, when the question is a word, the system control unit 14 of the response determination server 10 uses the acquired word itself as the question.

Next, the response determination server 10 performs the character conversion on the word (step S42). Specifically, the system control unit 14 of the response determination server 10 performs the character conversion on the acquired word as described in step S21, and generates a character-converted word. For example, the system control unit 14 of the response determination server 10 generates a character-converted word "きうよは" by switching "よ" and "う" in "きょうは". Further, the system control unit 14 of the response determination server 10 generates a character-converted word "tadoy" by switching "o" and "a" in "today".

Next, the response determination server 10 generates a character-converted question (step S43). Specifically, the system control unit 14 of the response determination server 10 generates a character-converted question by replacing the acquired word with the character-converted word in the sentence of the question. For example, the system control unit 14 of the response determination server 10 generates a character-converted question sentence "きうよは なにんち です か?" by replacing the word "きうよは" with the character-converted word "きうよは" and replacing the word "な んにち" with the character-converted word "なにんち" in the question sentence "きょうは なんにち です か". Here, a word order of words in the sentence does not change. In case of English, the system control unit 14 of the response determination server 10 generates a character-converted question sentence "Waht is the date tadoy?" by replacing the word "What" with the character-converted word "Waht" and replacing the word "today" with the character-converted word "tadoy" in the question sentence "What is the date today?".

Next, when the character-converted question column of the collation DB 12*a* is blank or when the same character-converted word is not present, the system control unit 14 of the response determination server 10 may stores the character-converted question in the collation DB 12*a* so that the character-converted question can be easily reused.

Next, the response determination server 10 transmits the character-converted question (step S44). Specifically, the system control unit 14 of the response determination server 10 transmits information related to the character-converted question to the terminal 30 which is an example of an output destination in a web page form via the communication unit 11.

In addition, when the character-converted question is already present in the collation DB 12*a*, the system control unit 14 of the response determination server 10 may acquire the character-converted question and the correct answer in step S40, skip steps S41 to S43, read the character-converted question from the character-converted question column of the collation DB 12*a*, and transmit the read character-converted question to the terminal 30.

Next, the terminal 30 receives the character-converted question (step S45). Specifically, the system control unit 36 of the terminal 30 receives the information related to the character-converted question from the response determination server 10 via the communication unit 31.

Next, the terminal 30 displays the character-converted question (step S46). Specifically, the system control unit 36 of the terminal 30 displays a web page 50 or 50B as illustrated in FIG. 13A or 13B, a web page 55 or 55B as illustrated in FIG. 14A or 14B, a web page 60 or 60B as illustrated in FIG. 15A or 15B, or a web page 65 or 65B as illustrated in FIG. 16A or 16B on the display unit 33.

Figure 13A:
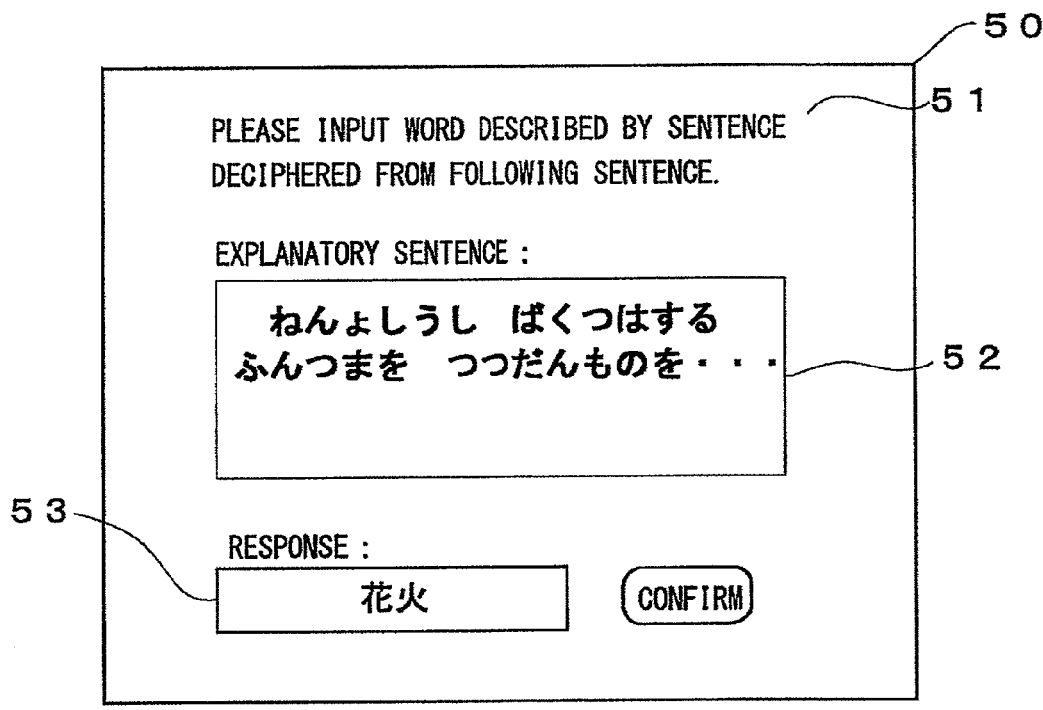
FIGS. 13A and 13B are schematic diagrams illustrating first modified examples of a character-converted question and a response displayed on the terminal of FIG. 1.
Figure 13B:
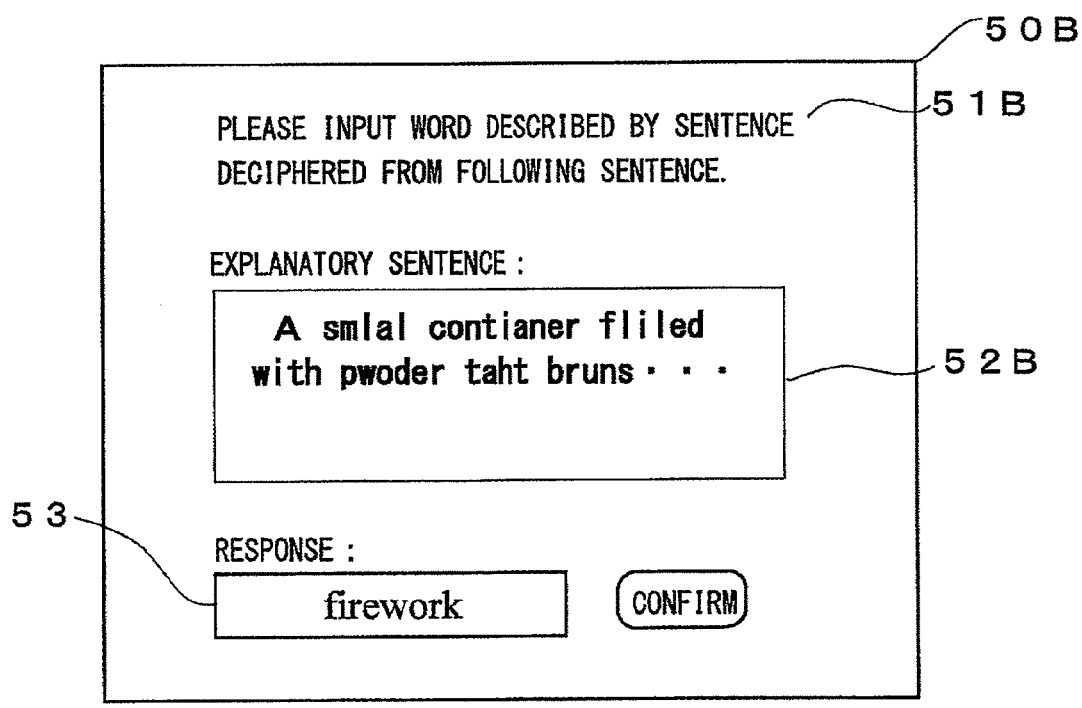

In FIGS. 13A and 13B, the queries generated by (1) the method of generating the question from the correct answer are displayed on the web pages 50 and 50B. In the case of FIGS. 13A and 13B, the system control unit 14 of the response determination server 10 acquires the question and the correct answer from a table illustrated in FIG. 5.

Figure 14A:
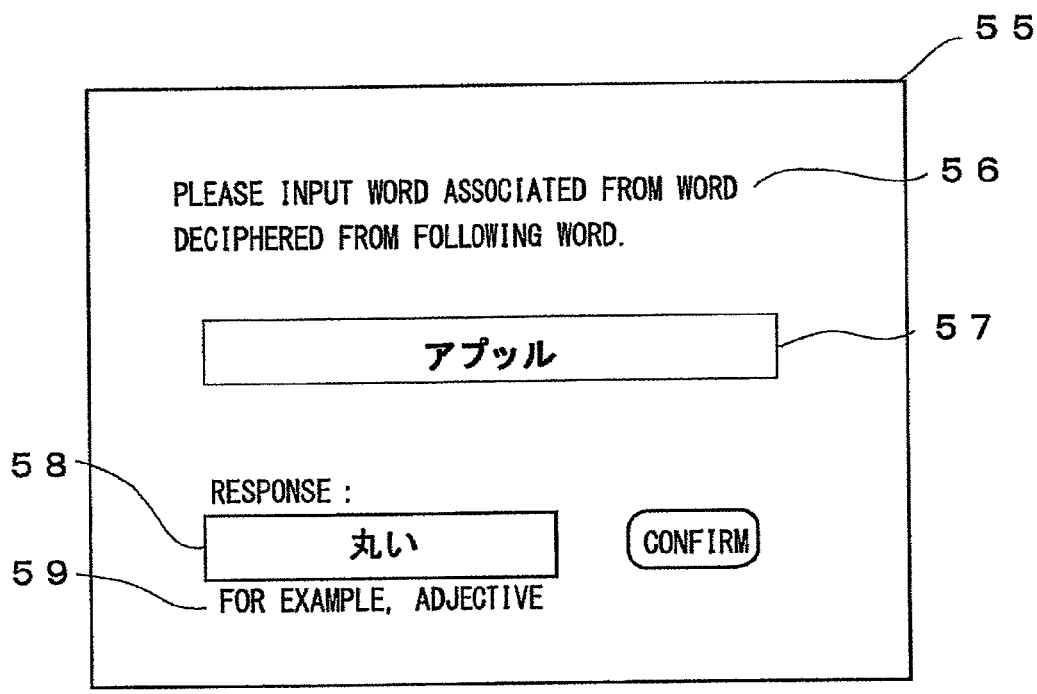
FIGS. 14A and 14B are schematic diagrams illustrating second modified examples of a character-converted question and a response displayed on the terminal of FIG. 1.
Figure 14B:
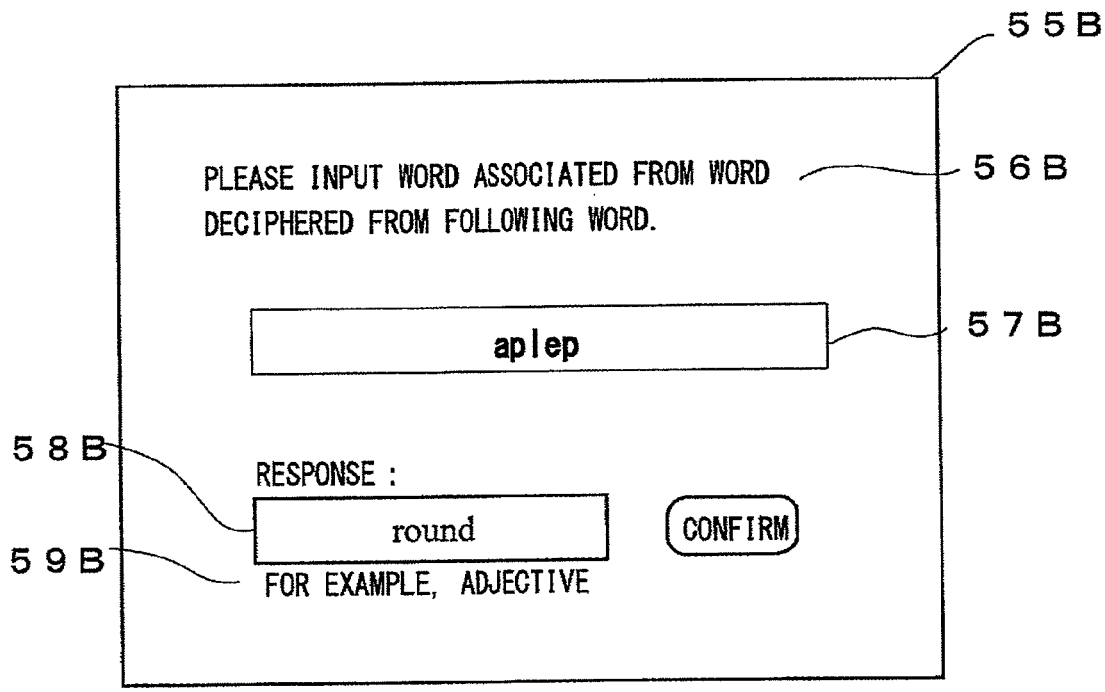

In FIGS. 14A and 14B, the queries generated by (2) the method of generating the correct answer from the question are displayed on the web pages 55 and 55B. In FIGS. 15A and 15B, the queries generated by (3) the method of generating the question and the correct answer from the sentence are displayed on the web pages 60 and 60B. In FIGS. 16A and 16B, the queries generated by (5) the method of acquiring the question and the correct answer which have been prepared in advance are displayed on the web pages 65 and 65B. In the case of FIGS. 16A and 16B, the system control unit 14 of the response determination server 10 acquires the question and the correct answer from the table illustrated in FIG. 4.

Figure 15A:
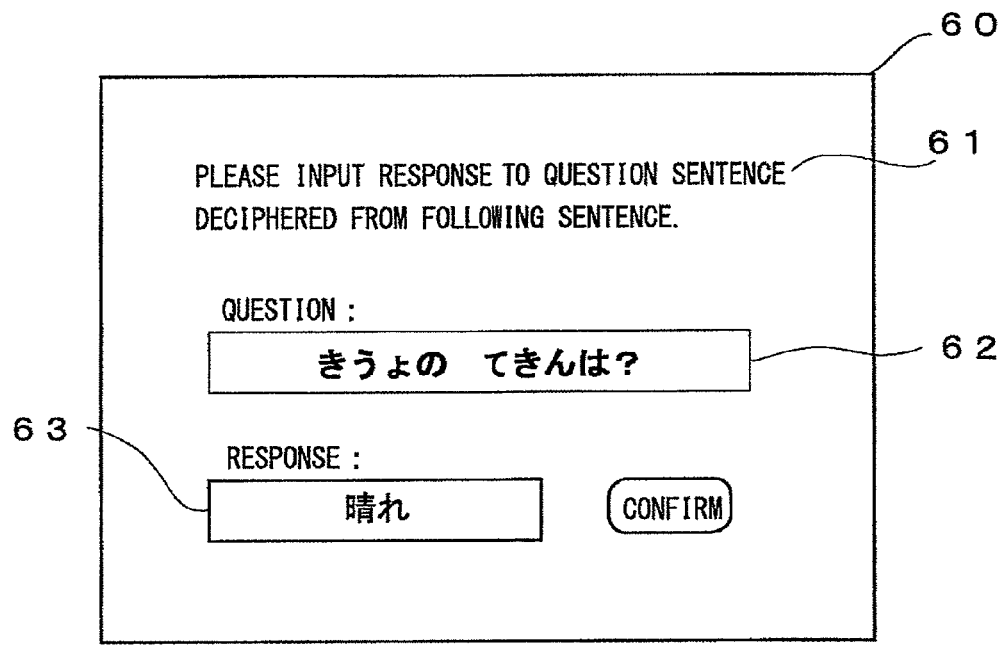
FIGS. 15A and 15B are schematic diagrams illustrating third modified examples of a character-converted question and a response displayed on the terminal of FIG. 1.
Figure 15B:
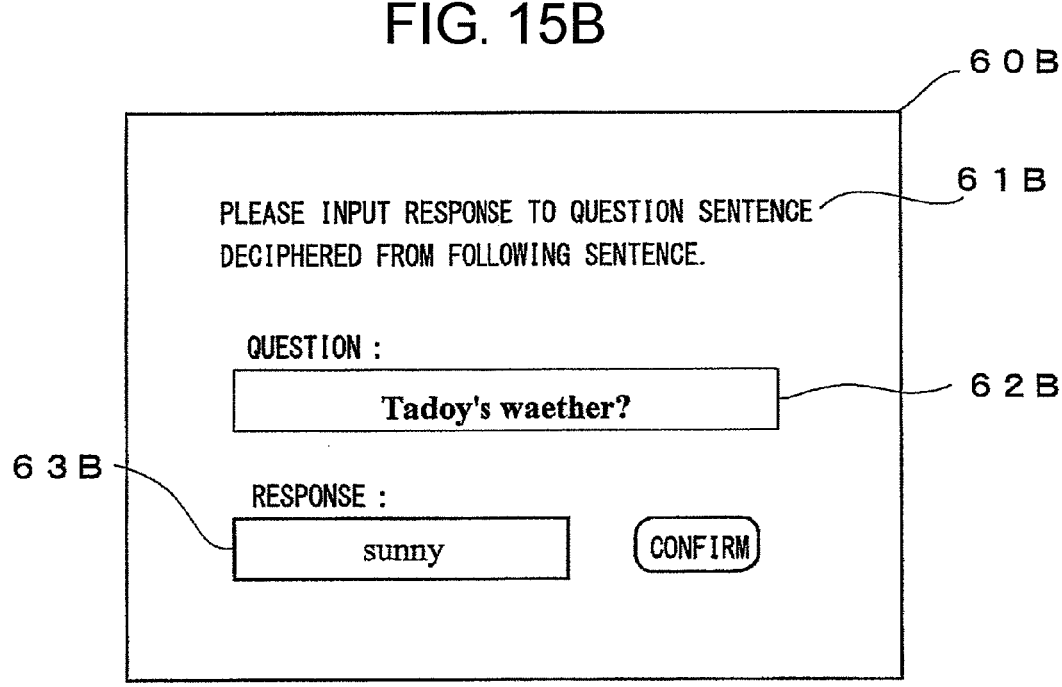
Figure 16A:
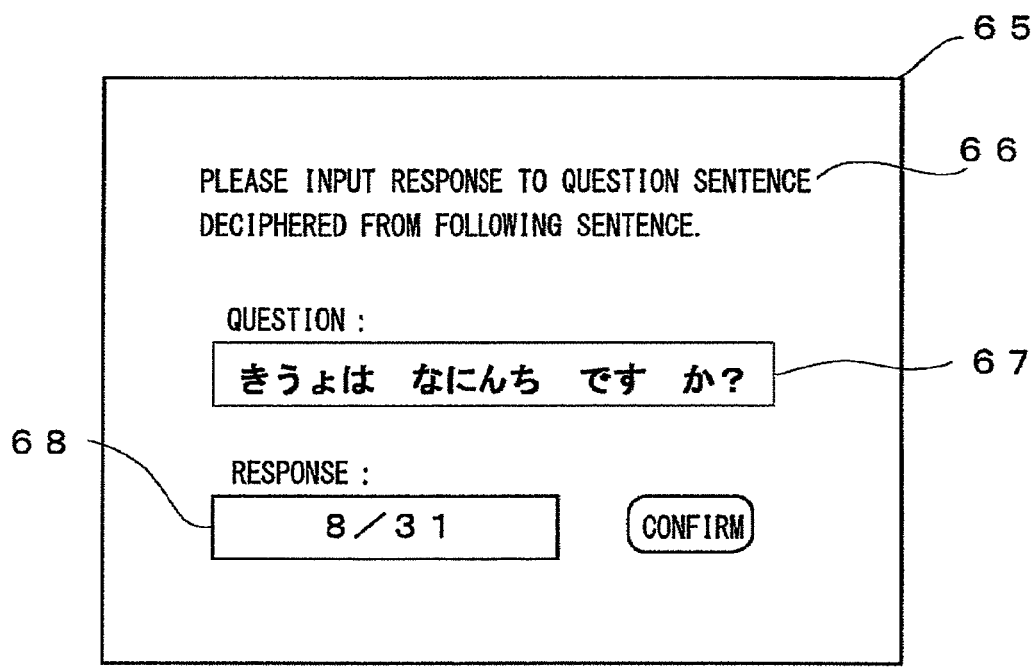
FIGS. 16A and 16B are schematic diagrams illustrating fourth modified examples of a character-converted question and a response displayed on the terminal of FIG. 1.
Figure 16B:
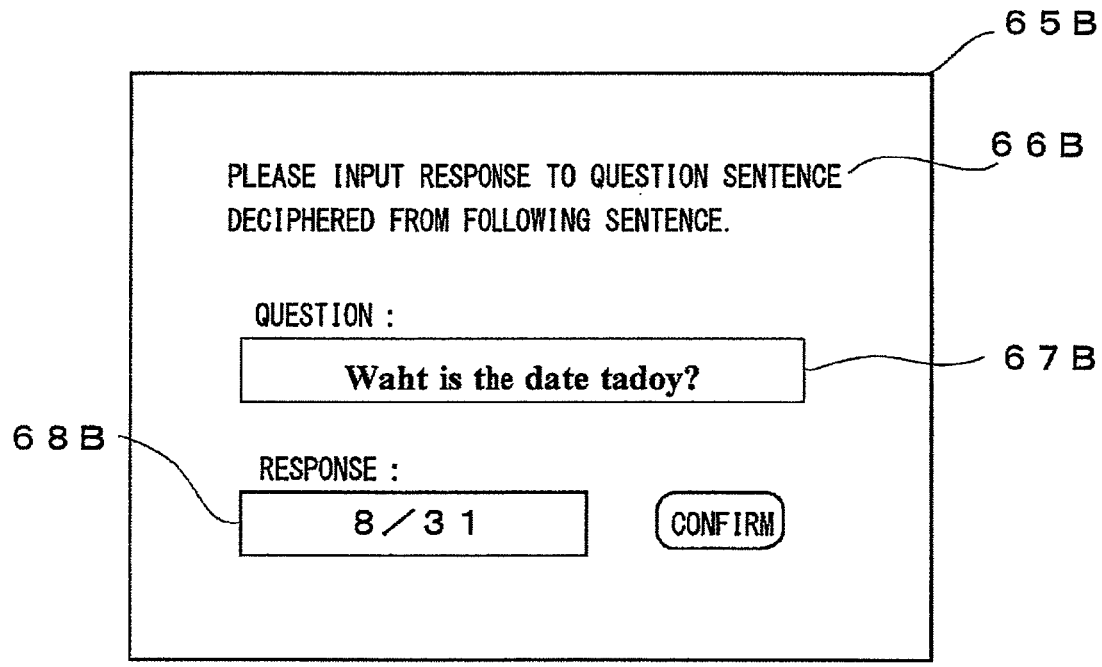

Instruction sentence columns 51 and 51B of FIGS. 13A and 13B, instruction sentence columns 56 and 56B of FIGS. 14A and 14B, instruction sentence columns 61 and 61B of FIGS. 15A and 15B, and instruction sentence columns 66 and 66B of FIGS. 16A *and* 16B correspond to the instruction sentence columns 41 and 41B of FIGS. 11A and 11B. Further, question display frames 52 and 52B of FIGS. 13A and 13B, question display frames 57 and 57B of FIGS. 14A and 14B, question display frames 62 and 62B of FIGS. 15A and 15B, and question display frames 67 and 67B of FIGS. 16A and 16B correspond to the question display frames 42 and 42B of FIGS. 11A and 11B. Further, response writing columns 53 and 53B of FIGS. 13A and 13B, response writing columns 58 and 58B of FIGS. 14A and 14B, response writing columns 63 and 63B of FIGS. 15A and 15B, and response writing columns 68 and 68B of FIGS. 16A and 16B correspond to the response writing columns 43 and 43B of FIGS. 11A and 11B. Hint columns 59 and 59B of FIGS. 14A and 14B correspond to the hint columns 44 and 44B of FIGS. 11A and 11B.

As illustrated in FIGS. 13A and 13B, a character-converted question "ねんょしうし ばくつはする ふんつま を つつだん ものを ..." and a character-converted question "A smlal contianer filled with pwoder taht bruns ..." are displayed on the question display frames 52 and 52B, respectively, together with an instruction sentence "Please input word described by sentence deciphered from following sentence." of the instruction sentence columns 51 and 51B.

Further, as illustrated in FIGS. 14A and 14B, a character-converted question "アプッル" and a character-converted question "aplep" are displayed on the question display frames 57 and 57B, respectively, together with an instruction sentence "Please input word associated from word deciphered from following word." of the instruction sentence columns 56 and 56B. Here, in order to narrow the width of an association and increase the user's correct answer rate, a hint "for example, adjective" may be displayed on the hint columns 59 and 59B.

Further, as illustrated in FIGS. 15A and 15B, a character-converted question "きうよの てきんは ?" and a character-converted question "Tadoy's waether?" are displayed on the question display frames 62 and 62B, respectively, together with an instruction sentence "Please input response to question sentence deciphered from following sentence." of the instruction sentence columns 61 and 61B.

Further, as illustrated in FIGS. 16A and 16B, a character-converted question "きうよは なにんち ですか ?" and a character-converted question "Waht is the date tadoy?" are displayed on the question display frames 67 and 67B, respectively, together with an instruction sentence "Please input response to question sentence deciphered from following sentence." of the instruction sentence columns 66 and 66B.

Next, the terminal 30 receives an input of a response (step S47). Specifically, the system control unit 36 of the terminal 30 causes the response which the user has input through the operating unit 34 to be displayed on the response writing column 48 or 48B, the response writing column 53 or 53B, and the response writing column 58 or 58B of the display unit 33. As illustrated in FIGS. 13A and 13B to FIGS. 16A and 16B, a response "花火", a response "firework", a response "丸い", a response "round", a response "晴れ", a response "clear", and a response "8/31" are displayed on the respective response writing columns.

Next, the terminal 30 transmits the response (step S48). Specifically, the system control unit 36 of the terminal 30 transmits information of the responses input to the response writing column 53, 53B, 58, 58B, 63, 63B, 68, or 68B to the response determination server 10 via the communication unit 31 when a confirm button displayed on the web page 50, 50B, 55, 55B, 60, 60B, 65, or 65B is clicked.

Next, the response determination server 10 receives the response (step S49). Specifically, the system control unit 14 of the response determination server 10 receives the response from the terminal 30 as in step S27.

Next, the response determination server 10 compares the response with the correct answer and determines whether or not the response is the correct answer (step S50). Specifically, the system control unit 14 of the response determination server 10 reads the correct answer stored in the RAM 14*c*, and determines whether or not the read correct answer matches with the received response, as an example of the response determining means.

As illustrated in FIGS. 13A and 13B, when the question prior to the character conversion is "ねんしょうし ばくはつする . . ." or the like, the system control unit 14 of the response determination server 10 determines whether or not the received response is any one of "花火", "はなび", "firework", and the like.

As illustrated in FIGS. 14A and 14B, when the question prior to the character conversion is "アップル" or "apple", the system control unit 14 of the response determination server 10 determines whether or not the received response is any one of "丸い", "round", and the like.

As illustrated in FIGS. 15A and 15B, when the question prior to the character conversion is "きょうの てんきは ?" or "Today's weather?", the system control unit 14 of the response determination server 10 determines whether or not the received response is any one of "晴れ", "快晴", "sunny", "clear", and the like.

As illustrated in FIGS. 16A and 16B, when the question prior to the character conversion is "きょうは なんにち ですか ?" or "What is the date today", the system control unit 14 of the response determination server 10 acquires a date of today from the function "$ date" as a correct answer to be compared to the response. Then, the system control unit 14 of the response determination server 10 determines whether or not the received response is any one of "8/31", "August 31", and the like. Here, when it is determined the received response matches with the correct answer, it is regarded as a correct answer, whereas when it is determined that the received response does not match with the correct answer, it is regarded as an incorrect answer.

Next, the response determination server 10 transmits the determination result (step S51). Specifically, the system control unit 14 of the response determination server 10 transmits the determination result to the terminal 30 as in step S29.

Next, the terminal 30 receives the determination result (step S52). Specifically, the system control unit 36 of the terminal 30 receives the determination result from the response determination server 10 as in step S30.

Next, the terminal 30 displays the determination result (step S53). Specifically, the system control unit 36 of the terminal 30 displays the determination result on the display unit 33 as in step S31.

As described above, according to the present embodiment, text information of a sentence, a word, or the like is acquired, a question including text information and a correct answer to the question are set, a word (for example, "きょうは" or "today") is acquired from the question, part of a character string configuring the acquired word is converted into a different character string or character, a character-converted question corresponding to the question is generated using a converted character-converted word (for example, "きうよは" or "tadoy"), information of the character-converted question is output to an output destination such as the terminal 30, an input of a response to the character-converted question is received from the terminal 30 or the like, and it is determined whether or not the received response matches with the correct answer. Since part of the character string of the word included in the question is converted into a different character string or character, a CAPTCHA can be implemented that is easily read by human as a word prior to the character conversion but is hardly recognized by a computer without lowering legibility by human.

Further, since human needs not check a suggested question carefully, the response determination server 10 or the like can prevent the user's eyes from being fatigued.

Further, when a set question or a correct answer is stored in the collation DB 12*a*, the RAM 14*c*, or the like and it is determined whether or not a received response match with the correct answer with reference to the collation DB 12*a*, the RAM 14*c*, or the like, a database of a question and a correct answer is constructed, and so a response can be collated at a higher speed.

Further, when a question sentence is stored as a question, a word is acquired from the question sentence, and a character-converted question is generated by replacing the acquired word with a character-converted word in the question sentence, a CAPTCHA is hardly recognized by a computer, an authentication strength on human increases, and the response determination server 10 can prevent a bot or the like from invading the system.

Further, when a question and a correct answer to the question are generated, the response determination server 10 can automatically generate a lot of queries and correct answers, and thus the response determination server 10 can prevent obsolescence of a combination of the question and the correct answer and effectively prevent a bot or the like from invading the system.

Further, when a question is generated from a correct answer as in (1) the method of generating the question from the correct answer, only by giving the correct answer, the response determination server 10 can generate a variety of queries from the search result on the correct answer and thus effectively prevent a bot or the like from invading the system.

Further, when a question is generated from a search result on a search keyword in which a correct answer as the search keyword as in (1) the method of generating the question from the correct answer, the response determination server 10 can generate a variety of queries, for example, from the Internet from the search result on the question.

Further, when a correct answer is generated from a question as in (2) the method of generating the correct answer from the question, by using an association word (for example, "丸い") as a correct answer to a character-converted question (for example, "アプッル") rather than using a question ("アッ プル") prior to the character conversion as a correct answer, a CAPTCHA is hardly recognized by a computer, an authentication strength on human increases, and the response determination server 10 can prevent a bot or the like from invading the system.

Further, when a sentence is stored and a question and a correct answer are generated from the sentence as in (3) the method of generating the question and the correct answer from the sentence, only by giving the sentence, a lot of queries and correct answers can be automatically generated, obsolescence of a combination of the question and the correct answer can be prevented, and a bot or the like can be prevented from invading the system.

Further, when an acquired word is stored as a correct answer to a question, a character-converted word is generated as a character-converted question, and it is determined whether or not a received response matches with the word which is the correct answer, a simple CAPTCHA can be implemented that is hardly recognized by a computer without lowering legibility by human.

Further, when a character-converted question is stored in the collation DB 12*a*, by storing the character-converted question in the database in advance, a processing load can be reduced.

In addition, a word which is to be subjected to the character conversion may be acquired based on user information as the condition for applying the character conversion. In this case, the system control unit 14 of the response determination server 10 acquires user information such as a user's occupation, a user's hobby, a user's purchase history, and a user's interested theme from the member DE 22*b* as an example of a user information acquiring means. The system control unit 14 of the response determination server 10 acquires a word from a question in the collation DB 12*a* which is an example of the question storing means based on the user information. For example, when the user's occupation is a medical-related occupation, the character conversion may be performed on technical words such as medical words, and when the user's hobby is gardening, the character conversion may be performed on flower names or gardening words. Further, the system control unit 14 of the response determination server 10 may select a question having a category code which the user can easily response to based on the user information. Further, a dictionary in which easy-to-answer words for the user are collected for each of users may be constructed in the storage unit 12 or the storage unit 22.

As described above, when the response determination server 10 acquires user information of a user who respond to the character-converted question and acquires a word from a question based on the user information, since the character conversion is performed on a word known by the user or a word family to the user, it is difficult for the user to make a mistake, and the user easily recognizes a CAPTCHA. Further, when the response determination server 10 generates a question or a correct answer specific to the user such as the weather of a place where the user is living based on the user information, not only a CAPTCHA that is easily recognized by the user but hardly recognized by a computer can be implemented, but also other people can be prevented from impersonating.

Further, the response determination server 10 may decide the difficulty of a question according to the level of the character conversion. Further, the server system 5 or the response determination server 10 may include the dictionary DB 8 of the data search server 7. Further, the response determination server 10 may generate a question or a correct answer using the goods DB 22*a* in the same manner as the dictionary DB 8. The system control unit 14 of the response determination server 10 generates a correct answer from a question or generates a question from a correct answer using goods information in the goods DB 22*a*. In this case, a CAPTCHA which the user can easily understand based on the goods information can be easily implemented. Further, the response determination server 10 may decide the condition for applying the character conversion, the difficulty of a question, or a category of a question based on the goods information in the goods DB 22*a*.

Further, the terminal 30 may perform the response determination by performing the same process as in the response determination server 10 or by using the dictionary DB 8 installed therein. In this case, the display unit 33 of the terminal 30 may be an output destination to which information of the character-converted question is output, and a CAPTCHA may be used for authentication when the terminal 30 is logged in.

[4. Operation of Response Determination System According to Second Embodiment]

Next, an operation of the response determination system according to a second embodiment will be described with reference to the accompanying drawings. In addition, the same or corresponding portions as the first embodiment will be assigned the same reference numerals, and only different configurations and functions will be described. The same applies to the other embodiments and modified examples.

(4.1 When Question is Generated from Correct Answer)

First, an operation of the response determination system according to the second embodiment of the present invention will be described in connection with an example in which a question is generated from a correct answer with reference to FIG. 17 and FIGS. 13A and 13B.

Figure 17:
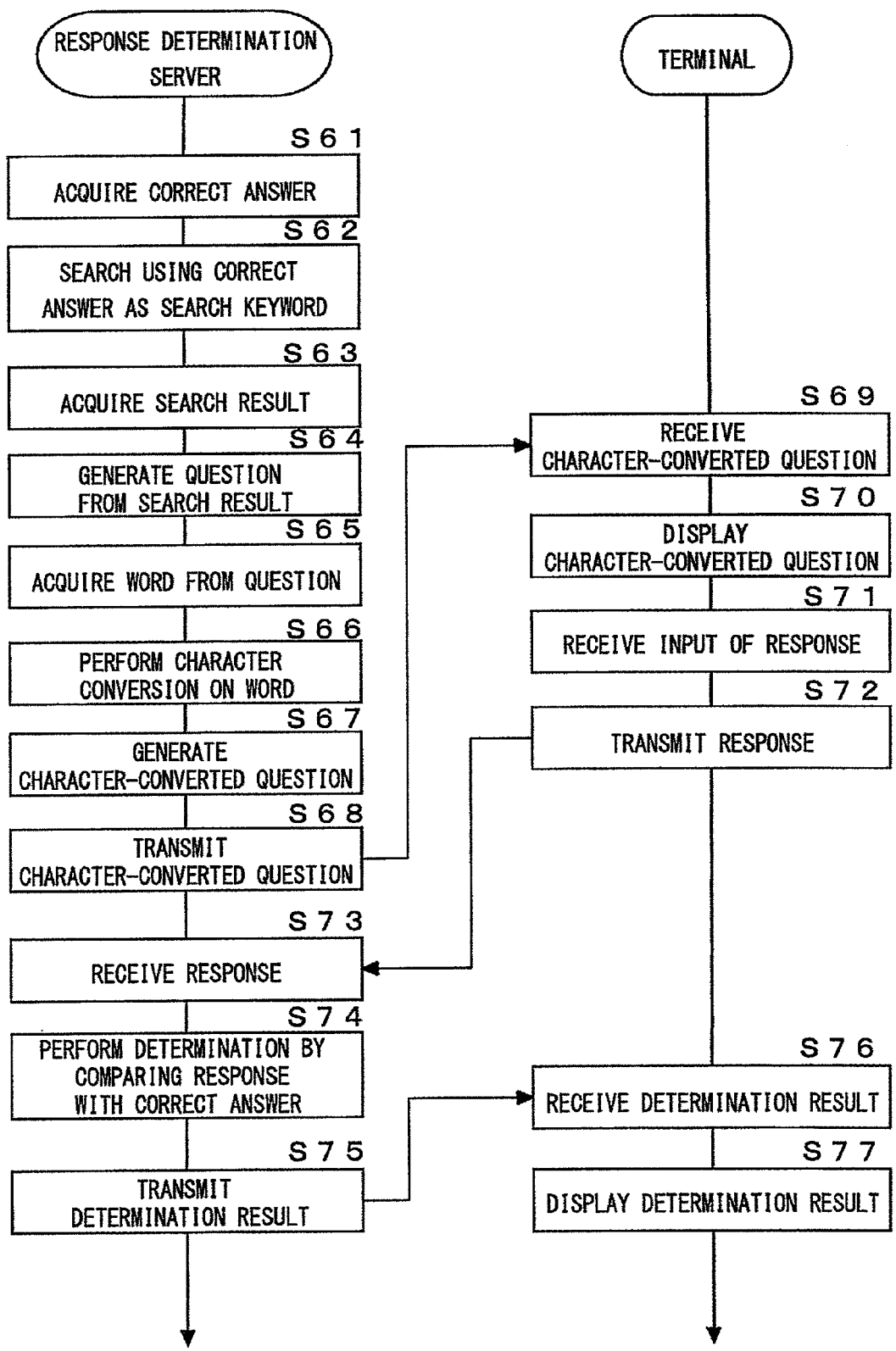
FIG. 17 is a sequence diagram illustrating an operation example of the response determination system of FIG. 1 according to a second embodiment.

FIG. 17 is a sequence diagram illustrating an operation example of the response determination system 1 according to the second embodiment of the present invention.

After the shopping server 20 transmits a CAPTCHA authentication signal to the response determination server 10, first, the response determination server 10 acquires a correct answer (step S61) as in step S1 of the operation according to the first embodiment, as illustrated in FIG. 17. As described above, by acquiring the correct answer including text information, the system control unit 14 of the response determination server 10 functions as an example of the question/correct answer acquiring means that acquires a question including text information, and a correct answer to the question.

Next, the response determination server 10 performs a search using the correct answer as a search keyword (step S62) as in step S2 of the operation according to the first embodiment.

Next, the response determination server 10 acquires the search result (step S63) as in step S3 of the operation according to the first embodiment.

Next, the response determination server 10 generates a question including text information from the search result (step S64) as in step S4 of the operation according to the first embodiment. As described above, by generating the question from the search result, the system control unit 14 of the response determination server 10 functions as an example of the question/correct answer acquiring means that acquires the question including the text information, and the correct answer to the question.

Next, the response, determination server 10 acquires a word from the question (step S65) as in step S41 of the operation according to the first embodiment. For example, the system control unit 14 of the response determination server 10 acquires words "ねんしょうし" and "ばくはつする" or the like from a sentence "ねんしょうし ばくはつする ふんまつを …". For example, when the question sentence is "A small container filled with powder that burns …", the system control unit 14 of the response determination server 10 acquires the words "small", "container", or the like. In addition, when the question is a word, the system control unit 14 of the response determination server 10 uses the acquired word itself as the question.

Next, the response determination server 10 performs the character conversion on the word (step S66) as in steps S21 and S42 of the operation according to the first embodiment. For example, the system control unit 14 of the response determination server 10 generates a character-converted word "ねんょしうし" by switching "ん" and "ょ" in "ねんしょうし", and generates a character-converted word "ばくつはする" by switching "は" and "つ" in "ばくはつする". Further, the system control unit 14 of the response determination server 10 generates a character-converted word "smlal" by switching "a" and "l" in "small", and generates a character-converted word "contianer" by switching "i" and "a" in "container".

Next, the response determination server 10 generates a character-converted question (step S67) as in steps S15 and S43 of the operation according to the first embodiment. For example, the system control unit 14 of the response determination server 10 generates a character-converted question sentence "ねんょしうし ばくつはする ふんつまを つつだんものを …" by performing a process of replacing the word "ねんしょうし" with the character-converted word "ねんょしうし", replacing word "ばく はつする" with the character-converted word "ばくつはする", and the like on the question sentence "ねんしょうし ばくはつする ふんまつを …". The system control unit 14 of the response determination server 10 stores the generated character-converted question in the RAM 14c, the storage unit 12, or the like. As described above, the system control unit 14 of the response determination server 10 generates the character-converted question corresponding to the question using the converted character-converted word.

Next, the response determination server 10 transmits the character-converted question (step S68) as in steps S22 and S44 of the operation according to the first embodiment.

Next, the terminal 30 receives the character-converted question (step S69) as in steps S23 and S45 of the operation according to the first embodiment.

Next, the terminal 30 displays the character-converted question (step S70) as in steps S24 and S46 of the operation according to the first embodiment. Specifically, the system control unit 36 of the terminal 30 displays the web page 50 or 50B for performing CAPTCHA authentication for goods review writing permission on the display unit 33 as illustrated in FIG. 13A or 13B. The character-converted question is displayed on the web page 50 or 50B.

Next, the terminal 30 receives an input of a response (step S71) as in steps S25 and S47 of the operation according to the first embodiment. For example, the system control unit 36 of the terminal 30 receives an input of a response including text information such as "花火" of the response writing column 53 or "firework" of the response writing column 53B.

Next, the terminal 30 transmits the response (step S72) as in steps S26 and S48 of the operation according to the first embodiment.

Next, the response determination server 10 receives the response (step S73) as in steps S27 and S49 of the operation according to the first embodiment.

Next, the response determination server 10 compares the response with the correct answer and determines whether or not the response is the correct answer (step S74) as in steps S28 and S50 of the operation according to the first embodiment.

Next, the response determination server 10 transmits the determination result (step S75) as in steps S29 and S51 of the operation according to the first embodiment.

Next, the terminal 30 receives the determination result (step S76) as in steps S30 and S52 of the operation according to the first embodiment.

Next, the terminal 30 displays the determination result (step S77) as in steps S31 and S53 of the operation according to the first embodiment.

(4.2 When Correct Answer is Generated from Question)

Next, a first modified example of an operation of the response determination system 1 according to the second embodiment of the present invention will be described in connection with an example in which a correct answer is generated from a question with reference to FIG. 18 and FIGS. 14A and 14B.

Figure 18:
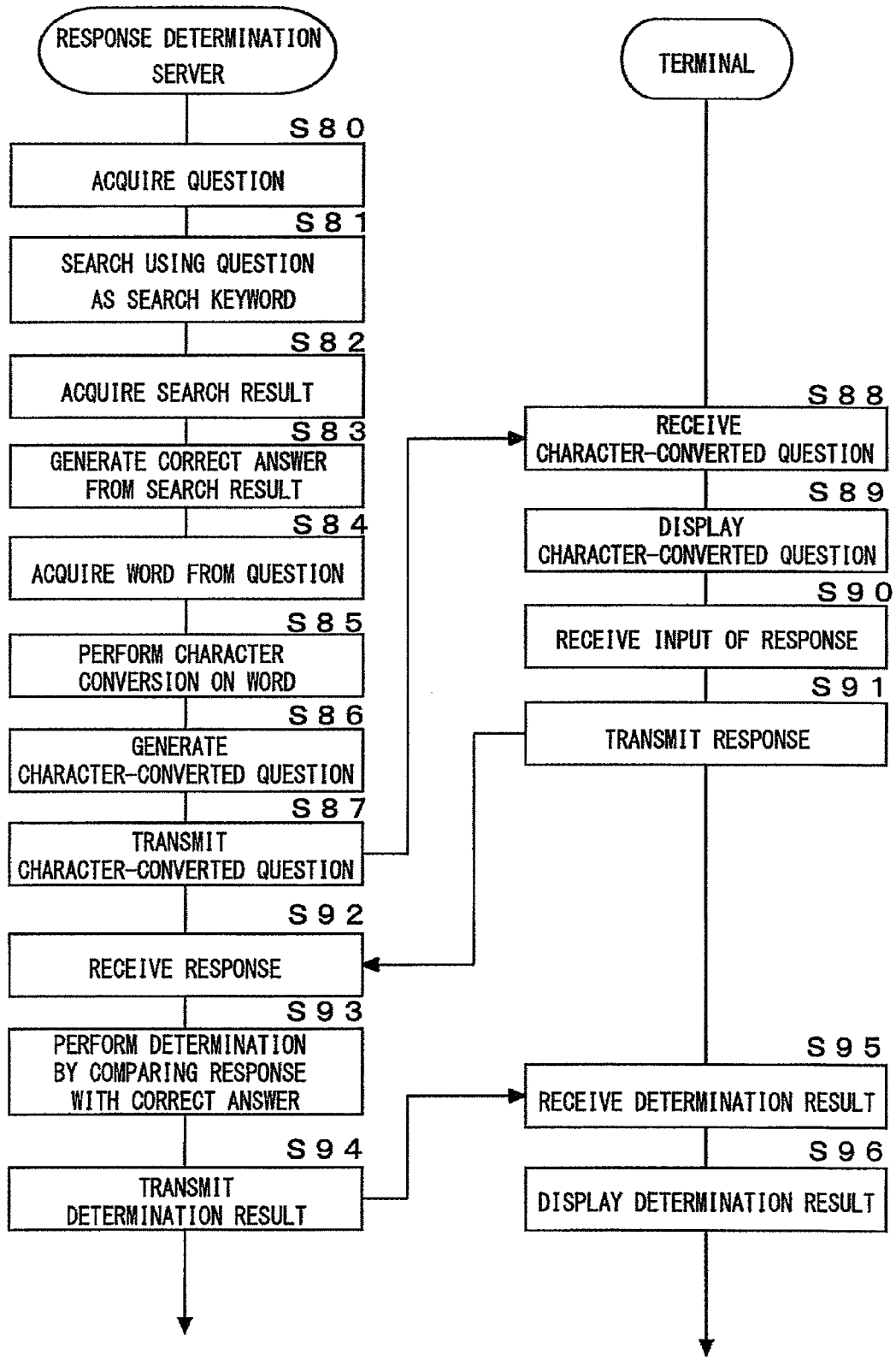
FIG. 18 is a sequence diagram illustrating a first modified example of an operation of the response determination system of FIG. 1 according to the second embodiment.

FIG. 18 is a sequence diagram illustrating a first modified example of an operation of the response determination system 1 according to the second embodiment.

As illustrated in FIG. 18, the response determination server 10 acquires a question including text information (step S80) as in step S5 of the operation according to the first embodiment. Specifically, the system control unit 14 of the response determination server 10 acquires a word such as "アップル" or "apple", a sentence, or the like, by receiving input from an input means (not shown) as a question, or by reading a question of a word, a sentence, or the like previously stored in the storage unit 12 functioning as an example the question storing means that stores a question including text information, as an example of the question/correct answer acquiring means, or by acquiring a question via the network 3. The system control unit 14 of the response determination server 10 may extract an arbitrary word or sentence from a sentence included in a web page acquired via the network 3. As described above, by acquiring a question including text information and setting the acquired question as the question, the system control unit 14 of the response determination server 10 functions as an example of the question/correct answer acquiring means that acquires a question including text information, and a correct answer to the question.

Next, the response determination server 10 performs a search using the question as a search keyword (step S81) as in step S6 of the operation according to the first embodiment.

Next, the response determination server 10 acquires a search result (step S82) as in step S7 of the operation according to the first embodiment.

Next, the response determination server 10 generates a correct answer from the search result (step S83) as in step S8 of the operation according to the first embodiment.

Next, the response determination server 10 acquires a word from the question (step S84). Specifically, the system control unit 14 of the response determination server 10 acquires a word that satisfies the condition for applying the character conversion as an example of the word acquiring means as in step S65. When the question is a word like the question "アップル", the system control unit 14 of the response determination server 10 uses the question "アップル" as a word "アップル".

Next, the response determination server 10 performs the character conversion on the word (step S85). Specifically, the system control unit 14 of the response determination server 10 converts part of a character string configuring the acquired word into a different character string as in step S66. For example, the system control unit 14 of the response determination server 10 converts the word "アップル" into a character-converted word "アプッル" or converts the word "apple" into a character-converted word "aplpe".

Next, the response determination server 10 generates a character-converted question (step S86). Specifically, the system control unit 14 of the response determination server 10 replaces the acquired word "アップル" with the character-converted word "アプッル", and uses the character-converted word "アプッル" as a character-converted question "アプッル" as in step S67.

Next, the response determination server 10 transmits the character-converted question (step S87). Specifically, the system control unit 14 of the response determination server 10 transmits information related to the character-converted question to the terminal 30 via the communication unit 11 in a web page form as in step S68.

Next, the terminal 30 receives the character-converted question (step S88). Specifically, the system control unit 36 of the terminal 30 receives the information related to the character-converted question from the response determination server 10 via the communication unit 31 as in step S69.

Next, the terminal 30 displays the character-converted question (step S89). Specifically, the system control unit 36 of the terminal 30 displays the web page 55 or 55B on the display unit 33 as illustrated in FIG. 14A or 14B as in step S70.

Next, the terminal 30 receives an input of a response (step S90). Specifically, the system control unit 36 of the terminal 30 receives an input of a response including text information such as "丸い" of the response writing column 58 or "round" of the response writing column 58B as in step S71.

Next, the terminal 30 transmits the response (step S91). Specifically, the system control unit 36 of the terminal 30 transmits information of the response input to the response writing column 58 or 58B to the response determination server 10 via the communication unit 31 when a confirm button displayed on the web page 55 or 55B is clicked as in step S72.

Next, the response determination server 10 receives the response (step S92). Specifically, the system control unit 14 of the response determination server 10 receives the response from the terminal 30 via the communication unit 11 as in step S73.

Next, the response determination server 10 compares the response with the correct answer and determines whether or not the response is the correct answer (step S93). Specifically, when the question prior to the character conversion is "アップル" or the like as illustrated in FIGS. 14A and 14B, the system control unit 14 of the response determination server 10 determines whether or not the received response is any one of "丸い", "赤い", "round", and the like as in step S74.

Next, the response determination server 10 transmits the determination result (step S94). Specifically, the system control unit 14 of the response determination server 10 transmits the determination result to the terminal 30 via the communication unit 11 as in step S75.

Next, the terminal 30 receives the determination result (step S95). Specifically, the system control unit 36 of the terminal 30 receives the determination result from the response determination server 10 via the communication unit 31 as in step S76.

Next, the terminal 30 displays the determination result (step S96). Specifically, the system control unit 36 of the terminal 30 displays the determination result on the display unit 33 as in step S77.

(4.3 When Question and Correct Answer are Generated from Sentence)

Next, a second modified example of an operation of the response determination system 1 according to the second embodiment will be described in connection with an example in which a question and a correct answer is generated from a sentence with reference to FIG. 19 and FIGS. 15A and 15B.

Figure 19:
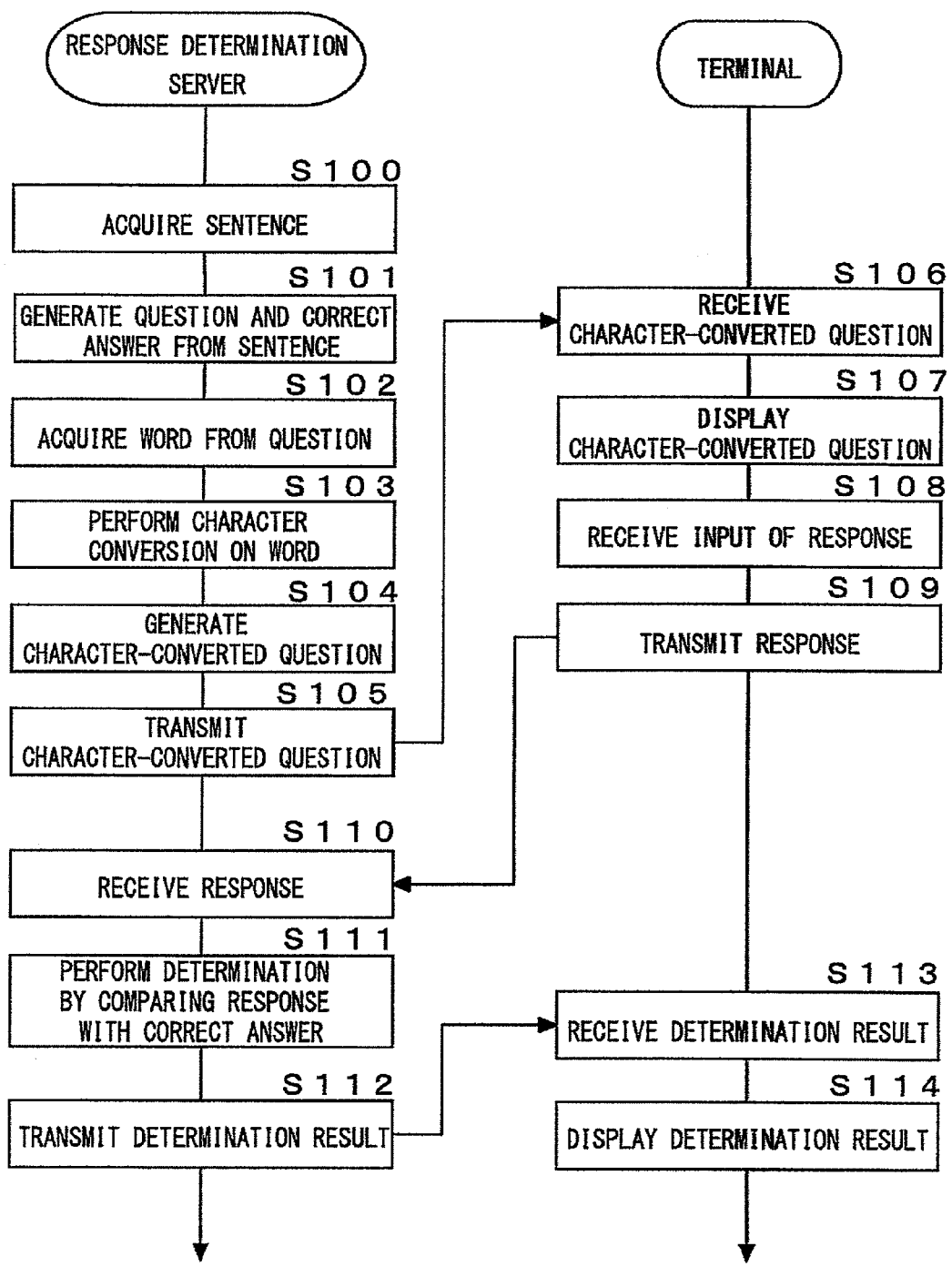
FIG. 19 is a sequence diagram illustrating a second modified example of an operation of the response determination system of FIG. 1 according to the second embodiment.

FIG. 19 is a sequence diagram illustrating a second modified example of an operation of the response determination system 1 according to the second embodiment.

The response determination server 10 acquires a sentence (step S100) as in step S10 of the operation according to the first embodiment.

Next, the response determination server 10 generates a question and a correct answer from the sentence (step S101) as in step S11 of the operation according to the first embodiment.

Next, the response determination server 10 acquires a word from the question (step S102). Specifically, the system control unit 14 of the response determination server 10 acquires a word that satisfies the condition for applying the character conversion as an example of the word acquiring means as in step S65. For example, the system control unit 14 of the response determination server 10 acquires words "きょうの", "てんきは", and the like from a sentence "きょうの てんきは?". For example, when a question sentence is "Today's weather?", the system control unit 14 of the response determination server 10 acquires words "Today's" and "weather".

Next, the response determination server 10 performs the character conversion on the word (step S103). Specifically, the system control unit 14 of the response determination server 10 converts part of a character string configuring the acquired word into a different character string as in step S66. For example, the system control unit 14 of the response determination server 10 generates a character-converted word "きうよは" by switching "よ" and "う" in "きょうは". Further, the system control unit 14 of the response determination server 10 generates a character-converted word "tadoy" by switching "o" and "a" in "today".

Next, the response determination server 10 generates a character-converted question (step S104). Specifically, as in step S67, the system control unit 14 of the response determination server 10 generates a character-converted question "きうよの てきんは?" from the question "きょうの てんき は?" by replacing the acquired word "きょうは" with the character-converted word "きうよは". Further, the system control unit 14 of the response determination server 10 generates a character-converted question "Tadoy's waether?" or the like from the question "Today's weather?".

Next, the response determination server 10 transmits the character-converted question (step S105). Specifically, the system control unit 14 of the response determination server 10 transmits information related to the character-converted question to the terminal 30 via the communication unit 11 in a web page form as in step S68.

Next, the terminal 30 receives the character-converted question (step S106). Specifically, the system control unit 36 of the terminal 30 receives the information related to the character-converted question from the response determination server 10 via the communication unit 31 as in step S69.

Next, the terminal 30 displays the character-converted question (step S107). Specifically, the system control unit 36 of the terminal 30 displays the web page 60 or 60B on the display unit 33 as illustrated in FIG. 15A or 15B as in step S70.

Further, as illustrated in FIG. 15, the character-converted question "きうよの てきんは?" or the character-converted question "Tadoy's waether?" is displayed on the question display frame 62 or 62B together with an instruction sentence "Please input response to sentence of question deciphered from following sentence." of the instruction sentence column 61 or 61B.

Next, the terminal 30 receives an input of a response (step S108). Specifically, the system control unit 36 of the terminal 30 receives an input of a response including text information such as "晴れ" of the response writing column 63 or "clear" of the response writing column 63B as in step S71.

Next, the terminal 30 transmits the response (step S109). Specifically, the system control unit 36 of the terminal 30 transmits information of the response input to the response writing column 63 or 63B to the response determination server 10 via the communication unit 31 when the confirm button displayed on the web page 60 or 60B is clicked as in step S72.

Next, the response determination server 10 receives the response (step S110). Specifically, the system control unit 14 of the response determination server 10 receives the response from the terminal 30 via the communication unit 11 as in step S73.

Next, the response determination server 10 compares the response with the correct answer and determines whether or not the response is the correct answer (step S111). Specifically, when the question prior to the character conversion is "きょうの てんきは?" or "Today's weather?" as illustrated in FIG. 15A or 15B, the system control unit 14 of the response determination server 10 determines whether or not the received response is any one of "晴れ", "快晴", "sunny", "clear", and the like as in step S74.

Next, the response determination server 10 transmits the determination result (step S112). Specifically, the system control unit 36 of the terminal 30 transmits the determination result to the terminal 30 from the response determination server 10 via the communication unit 11 as in step S75.

Next, the terminal 30 receives the determination result (step S113). Specifically, the system control unit 36 of the terminal 30 receives the determination result from the response determination server 10 via the communication unit 31 as in step S76.

Next, the terminal 30 displays the determination result (step S114). Specifically, the system control unit 36 of the terminal 30 displays the determination result on the display unit 33 as in step S77.

As described above, according to the present embodiment, a question including text information and a correct answer to the question are generated, a word is acquired from the question, part of a character string configuring the acquired word is converted into a different character string or character, a character-converted question corresponding to the question is generated using a converted character-converted word, information of the character-converted question is output to an output destination, an input of a response to the character-converted question is received, and it is determined whether or not the received response matches with the correct answer. Since the character-converted question in which part of the character string of the word included in the question is converted into a different character string or character and which human can easily read as a word prior to the character conversion and a correct answer to the question can be dynamically generated, and it is difficult to generate the same question. As a result, a CAPTCHA can be implemented that is hardly recognized by a computer without lowering legibility by human.

Further, by automatically generating a lot of queries and correct answers, the response determination server 10 can prevent obsolescence of a combination of the question and the correct answer and effectively prevent a bot or the like from invading the system.

Further, when a question is generated from a correct answer, only by giving the correct answer, the response determination server 10 can generate a variety of queries from the search result on the correct answer and effectively prevent a bot or the like from invading the system.

Further, when a question is generated from a search result on a search keyword in which a correct answer is used as the search keyword, the response determination server 10 can generate a variety of queries, for example, from the Internet from the search result on the question.

Further, when a correct answer is generated from a question, a CAPTCHA is hardly recognized by a computer, an authentication strength on human increases, and the response determination server 10 can prevent a bot or the like from invading the system.

Further, when a question and a correct answer are generated from an acquired sentence, only by giving the sentence, a lot of queries and correct answers can be automatically generated, obsolescence of a combination of the question and the correct answer can be prevented, and a bot or the like can be prevented from invading the system.

When a question sentence is generated as a question, a word is acquired from the question sentence, and a character-converted question is generated by replacing the acquired word with a character-converted word in the question sentence, a CAPTCHA is hardly recognized by a computer, an authentication strength on human increases, and the response determination server 10 can prevent a bot or the like from invading the system.

Next, an operation of the response determination system according to the second embodiment will be described in connection with a modified example of a character-converted question and a response with reference to FIGS. 11A and 11B and FIGS. 16A and 16B.

In case of FIGS. 16A and 16B, the system control unit 14 of the response determination server 10 may generate a correct answer from a question, to generate a question from a correct answer, or to generate a question or a correct answer from a phrase such as "今日の日付" using a semantic analysis technique or a parsing technique. The system control unit 14 of the response determination server 10 may store a question including text information or a correct answer to the question in the storage unit 12 in advance. In this case, a correct answer is a function "$ date" for acquiring a date of today or the like.

In case of FIGS. 11A and 11B, a question is identical to a correct answer. The system control unit 14 of the response determination server 10 acquires a word from the dictionary DB8 or the like, generates the acquired word as the question and the correct answer, generates a character-converted word from the acquired word as a character-converted question, and determines whether or not a received response matches with the word which is the correct answer. In this case, a simple CAPTCHA can be implemented that is hardly recognized by a computer without lower legibility by human.

Figure 20A:
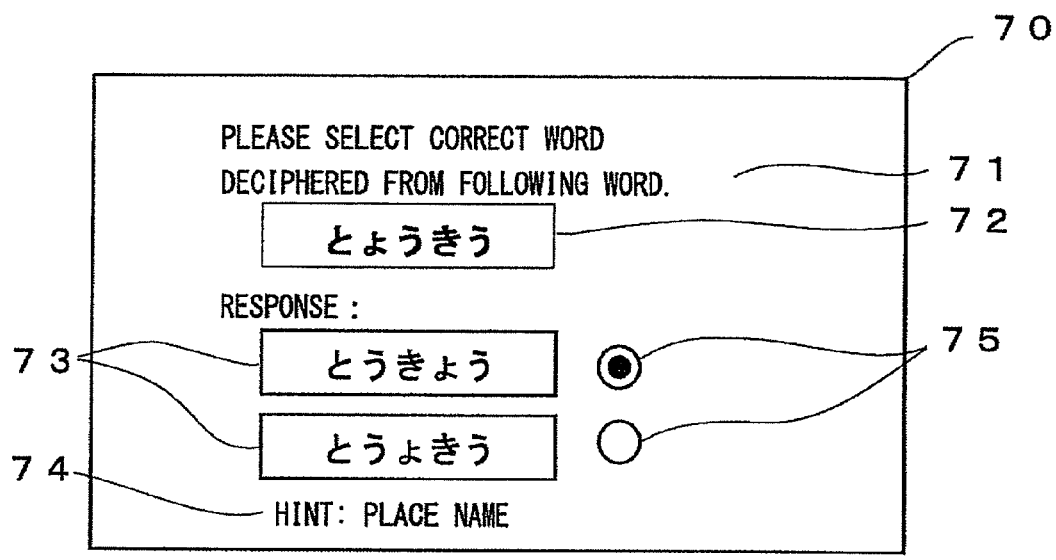
FIGS. 20A and 20B are schematic diagrams illustrating fifth modified examples of a character-converted question and a response displayed on the terminal of FIG. 1.
Figure 20B:
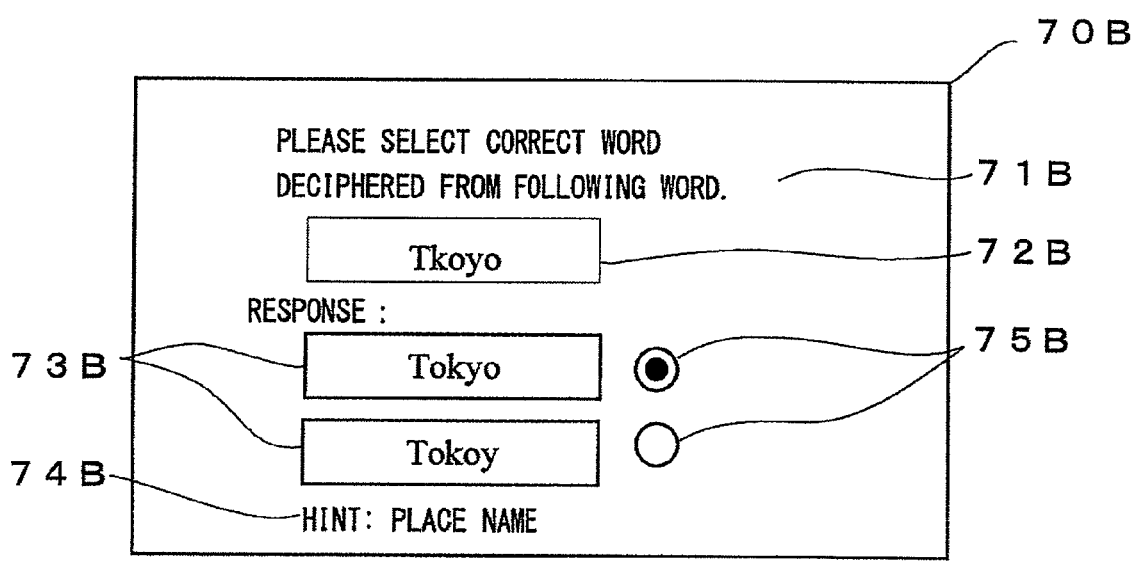

In addition, as illustrated in FIG. 20A or 20B, a response to a question may be selected from a response column 73 or 73B on a web page 70 or 70B using a radio button 75 or 75B, instead of writing a response in the response writing column as in FIGS. 11A and 11B, FIGS. 13A and 133 to FIGS. 16A and 16B. Here, instruction sentence columns 71 and 71B, question display frames 72 and 72B, hint columns 74 and 74B are the same as the instruction sentence columns 41 and 41B, the question display frames 42 and 42B, and hint columns 44 and 44B of FIGS. 11A and 11B, respectively.

Further, the length of a character string prior to the character conversion may differ from the length of a character string which has been subjected to the character conversion. For example, when the length of a character string "とうきょう" prior to the character conversion is increased, a character "よ" may be added, and so a character string which has been subjected to the character conversion may become "とようきょう". When the length of the character string "とうきょう" is decreased, a character "う" may be deleted, and so a character string which has been subjected to the character conversion may become "ときょう". In case of English, when the length of a character string "Tokyo" prior to the character conversion is increased, a character "k" may be added, and so a character string which has been subjected to the character conversion may become "Tokkyo". When the length of the character string "Tokyo" is decreased, a character string which has been subjected to the character conversion may become "Tkyo".

The system control unit 14 of the response determination server 10 may convert a specific character or character string in a question to a different character string or character without acquiring a word from a question as an example of the character converting means. For example, the system control unit 14 of the response determination server 10 may generate a character-converted question using a converted character string or character by collectively replacing "や" with "ゃ", collectively replacing "m" with "n", replacing superposed characters "mm" with "m", or replacing "m" with superposed characters "mm". At this time, the system control unit 14 of the response determination server 10 may search for a character string or character to convert by sequentially reading acquired text information starting from a first or last character. Through these replacements, "A small container filled with powder that burns ... communication ..." may be converted into "A smmall comtainer filled with powder that burns ... comunication ...". As described above, since part of a character string (for example, "mm") or character (for example, "m") included in a question is converted to a different character string or character, a CAPTCHA can be implemented that is easily read by human as a word prior to the character conversion but is hardly recognized by a computer without lowering legibility by human.

In addition, when part of a character string or character configuring an acquired word is converted into a different character string or character, and a character-converted question corresponding to the question is generated using a corresponding converted character-converted word, a replacement can be prevented from being performed between words.

Further, a picture or a symbol may be used as a correct answer. For example, in the case of FIGS. 14A and 14B, an instruction that a picture of an apple be drawn on a cherry may be given. In this case, the terminal 30 may transmits image data to the response determination server 10, and the system control unit 14 of the response determination server 10 may perform image analysis. At this time, when the image is similar to an apple picture, it may be recognized as a correct answer.

Still further, the present invention is not limited to each of the above embodiments. Each of the above embodiments is exemplary, and any embodiment that has substantially the same configuration as a technical sprit stated in claims of the present invention and has the same operations and effects is incorporated in the technical scope of the present invention.

DESCRIPTION OF REFERENCE NUMERALS

1: response determination system
5: server system (response determination apparatus)
10: response determination server (response determination apparatus)
12a: collation DB (correct answer storing means, question storing means, and sentence storing means)
20: shopping server (response determination apparatus)
22b: member DB
30: terminal
42, 42B, 52, 52B, 57, 57B, 62, 62B, 67, 67B, 72, 72B: question display frame (character-converted question)
43, 43B, 53, 53B, 58, 58B, 63, 63B, 68, 68B, 73, 73B: response column (response)

The invention claimed is:

1. A response determination apparatus, comprising:
a controller comprising a processor and a memory,
the controller configured to:
acquire a correct answer to a question;
generate the question from a search result on a search query in which the correct answer is used as a search keyword when the correct answer is used as the search keyword, the search result comprising at least one word to be included in the question;
convert the at least one word in the question so that characters are switched within the word, and generate a character-converted question corresponding to the question, wherein the at least one word including four or more characters, or a first or last character of the at least one word is not changed after the conversion;
output, via a communication unit, information of the character-converted question to an output destination;
receive, via the communication unit, an input of a response to the character-converted question; and
determine whether or not the received response matches with the correct answer, and determine that the received response is a response by human when the received response matches with the correct answer.

2. The response determination apparatus according to claim 1, wherein the controller is further configured to:
acquire a word from the question of a question storing unit that stores the question,
convert part of a character string or character configuring the acquired word into a different character string or character, and
generate the character-converted question corresponding to the question using the converted character-converted word.

3. The response determination apparatus according to claim 2, wherein the controller is further configured to:
acquire a question sentence as the question,
acquire a word from the question sentence, and
generate the character-converted question by replacing the acquired word with the character-converted word in the question sentence.

4. The response determination apparatus according to claim 2, wherein the controller is further configured to:
acquire the word acquired by the word acquiring unit as the correct answer to the question,
generate the character-converted word as the character-converted question, and
determine whether or not the received response matches with the word which is the correct answer.

5. The response determination apparatus according to claim 2, wherein the controller is further configured to:
acquire user information of a user who responds to the character-converted question, and
acquire the word from the question based on the user information.

6. The response determination apparatus according to claim 1, wherein the controller is further configured to:
generate one of the question or the correct answer to the question from a text information, and
generate the correct answer from a search result on a search query in which the question is used as the search keyword when the question is used as the search keyword.

7. A response determination method of determining a response received by a response determination apparatus including a processor and a memory, comprising:
acquiring, by the processor, a correct answer to a question;
generating, by the processor, the question from a search result on a search query in which the correct answer is used as a search keyword when the correct answer is used as the search keyword, the search result comprising at least one word to be included in the question;
converting, by the processor, the at least one word in the question so that characters are switched within the word, and generating a character-converted question corresponding to the question, wherein the at least one word including four or more characters, or a first or last character of the at least one word is not changed after the conversion;
outputting, by the processor, information of the character-converted question to an output destination;
receiving, by the processor, an input of a response to the character-converted question; and
determining, by the processor, whether or not the received response matches with the correct answer, and determining that the received response is a response by human when the received response matches with the correct answer.

8. A non-transitory computer-readable recording medium recording a response determination program causing a computer to:
acquire a correct answer to a question;
generate the question from a search result on a search query in which the correct answer is used as a search keyword when the correct answer is used as the search keyword, the search result comprising at least one word to be included in the question;
convert the at least one word so that characters are switched within the word, and generate a character-converted question corresponding to the question, wherein the at least one word including four or more characters, or a first or last character of the at least one word is not changed after the conversion;
output information of the character-converted question to an output destination;
receive an input of a response to the character-converted question; and
determine whether or not the received response matches with the correct answer, and determine that the received response matches with the correct answer.

9. A response determination system including a terminal and a response determination apparatus that is connected to the terminal via a network and determines whether or not a response from the terminal is successful, the system comprising:
the response determination apparatus including a controller that comprises a processor and a memory, the controller configured to:
acquire a correct answer to a question,
generate the question from a search result on a search query in which the correct answer is used as a search keyword when the correct answer is used as the search keyword, the search result comprising at least one word to be included in the question,
convert the at least one word so that characters are switched within the word, generate a character-converted question corresponding to the question, wherein the at least one word including four or more characters, or a first or last character of the at least one word is not changed after the conversion,
transmit information of the character-converted question to a terminal, receive an input of a response to the character-converted question from the terminal, determine whether or not the received response matches with the correct answer, and determine that the received response is a response by human when the received response matches with the correct answer, and transmit a determination result of the response determining unit to the terminal.

* * * * *